(12) United States Patent
Bellagamba et al.

(10) Patent No.: US 7,554,681 B2
(45) Date of Patent: Jun. 30, 2009

(54) SYSTEM FOR CONTROLLING BRAND INTEGRITY IN A NETWORK ENVIRONMENT

(76) Inventors: Herman A. Bellagamba, 2751 Evergreen Oaks, Henderson, NV (US) 89052; Timothy J. Bellagamba, 37 Oakdene Rd., Barrington Hills, IL (US) 60010

( * ) Notice: Subject to any disclaimer, the term of this patent is extended or adjusted under 35 U.S.C. 154(b) by 0 days.

(21) Appl. No.: 11/895,223

(22) Filed: Aug. 23, 2007

(65) Prior Publication Data

US 2007/0291293 A1 Dec. 20, 2007

Related U.S. Application Data

(62) Division of application No. 11/144,714, filed on Jun. 4, 2005, now Pat. No. 7,268,896.

(51) Int. Cl.
*G06F 5/00* (2006.01)
*G06K 15/02* (2006.01)

(52) U.S. Cl. ............... 358/1.12; 358/1.15; 358/403; 705/14; 705/27

(58) Field of Classification Search ............... 358/1.1, 358/1.15, 403, 1.12; 705/27, 14, 408; 709/217, 709/201
See application file for complete search history.

(56) References Cited

U.S. PATENT DOCUMENTS

| 6,611,349 | B1 * | 8/2003 | Vogt et al. ............... 358/1.15 |
| 6,738,155 | B1 | 5/2004 | Rosenlund et al. |
| 7,415,617 | B2 * | 8/2008 | Ginter et al. ............... 713/189 |

* cited by examiner

*Primary Examiner*—King Y Poon
*Assistant Examiner*—Iriana Cruz
(74) *Attorney, Agent, or Firm*—Meroni & Meroni, P.C.; Charles F. Meroni, Jr.; Christopher J. Scott

(57) ABSTRACT

A system enables geographically-spaced common-brand users to publish locale-specific, content-controlled messages. The system provides selective access to pre-constructed, digital, plate-ready macrotemplates. A dynamic document server stores the macrotemplates and authorizes selective access thereto based upon user-supplied credentials. The user, having authenticated credentials, may access a select macrotemplate, which necessarily comprises a plurality of digital, plate-ready microtemplates, including at least one restricted access template and at least one open access template. Authorized users may edit a select microtemplate as dictated by the user's level of authorization. The user may thus send the content-controlled digital, plate-ready file to a publisher for publishing information or messages compiled upon the macrotemplate. The system thereby enables geographically-spaced common-brand users to publish locale-specific, content-controlled messages.

20 Claims, 29 Drawing Sheets

New display advertisement
Home > Advertisements > New Advertisement

YOUR BRAND LOGO | Home | Advertisements | Market Sig Sets | Stores | Help | Log Out

Promotion Formats
- Display Advertisement
- Newspaper Insert
- Gatefold
- Tabloid

Tip
Select the promotion and document size you wish to create.

Help

May 12 - June 4, 2005 (ABCD)
Size: 3 Col. (6.437") x 14"
Create
←20

May 12 - June 4, 2005 (EFGH)
Size: 3 Col. (6.437") x 14"
Create
←20

Jun 5 - Jul 2, 2005 (ABCD)
Size: 3 Col. (6.437") x 14"
Create
←20

June 5 - Jul 2, 2005 (EFGH)
Size: 3 Col. (6.437") x 14"
Create
←20

FIGURE 7

| YOUR BRAND LOGO | Home  Advertisements  Market Sig Sets  Stores  Help  Log Out |

[Help]

Select market sig set

Home > Advertisements > New Advertisement > Select market sig set

Advertisement Market Sigs

Please select the market sig set you wish to use with this advertisement and click the "Preview Styles" button.

Select Market Sig Set

The number of sigs in the market sig set selected will determine the formats available for the sigs in the advertisement.

Market Sig Set: [Test 1 ▼]

Previewing styles could take up to 60 seconds.

[Preview Styles]

[Cancel]

FIGURE 8

Select Market Sig Set

The number of sigs in the market sig set selected will determine the formats available for the sigs in the advertisement.

Market Sig Set: Test 1 v

Previewing styles could take up to 60 seconds.

 Preview Styles

Select style to use

Please select the style you wish to use from the list below.
Click thumbnail image for larger preview.

Preview (Thumbnail not to scale)

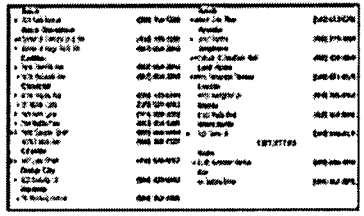  Select Style

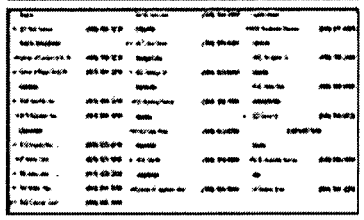  Select Style

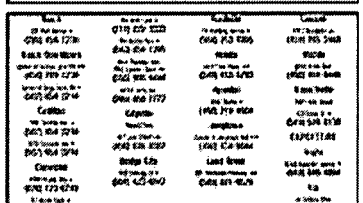  Select Style

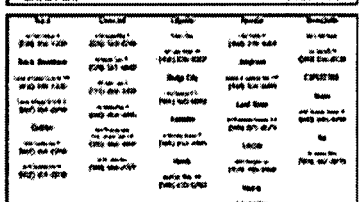  Select Style

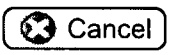 Cancel

Published advertisement details

Home > Advertisements > Published > Advertisement details

Promotion Details
- Promotion: Apr 7 - May 7, 2005 (ABC)
- Category: Display Advertisement

Advertisement Details
- ID #: 102919
- Width: 4.25" (2 column)
- Height: 13"
- Colors: 1 Color (Black)

Market Sig Set Details
- Sig Set: Demo Sigs (23)

Location Details
- Zone: Demo & Training
- District: #1 Demo & Training Dist.
- Store: -

Insertion Details
- Publication: Bell Litho, Inc.
- Run Date: 4-10-2005
- Delivery Method: Email
- View Full Insertion Order

Publishing Details
- Published On: 04/07/2005
- Published By: District Demo User

FIGURE 20

Email File Queue

SYSTEM FOR CONTROLLING BRAND INTEGRITY IN A NETWORK ENVIRONMENT

PRIOR HISTORY

This application is a divisional patent application of U.S. patent application Ser. No. 11/144,714 now U.S. Pat. No. 7,268,896, filed in the United States Patent and Trademark Office on Jun. 4 Jun. 2005.

BACKGROUND OF THE INVENTION

1. Field of the Invention

The present invention generally relates to the field of desktop publishing and printing. More particularly, the present invention relates to an online publishing portal that inherently teaches a system for controlling brand integrity as presented upon printed matter, which printed matter originates from geographically-spaced desktops in a network environment.

2. Description of the Prior Art

Given an audible prompt comprising a readily identifiable word, an experienced (and vocal) typesetter is able to instantaneously dissect the word into its component letters and recite the component letters aloud alphabetically. The recitation is reflexive, requiring little, if any, cognitive effort. The skill is developed over time with day to day typesetting experience and is simply reflective of the typesetter's conditioned response to perpetual workload as driven by consumer demand. The process of typesetting involves the presentation of textual material in an aesthetic form on paper or some other media. Before the development of innovations such as the dot matrix, inkjet, and laser jet printers, printed material was produced in print shops. In spite of centuries of innovation, the principle of printing remains the same: either a particular part of the page is marked or not marked with ink. This has remained true at the microscopic level even for halftone and four-color printing. Typesetting is the technology of deciding which parts of the paper should be marked, and printing is the technology of making the marks. However, the two are not rigidly separated: for example, ink flows during the printing process, and type design has to take into account the dynamics of ink on paper.

With the advent of computers, the inevitability of inventive computer-based typographical methodologies became apparent and thus the skill here anecdotally described may very well be shelved and replaced with computer means. In this last regard, it will be noted that software developers continually develop electronic means for achieving inventive end results. Service industries, such as the printing industry, for example, have seen rapid growth in the use of web-based interface means for enabling consumers to order printing services and/or printed products. In this regard, a number of inventive systems and methods have been developed as a means to embrace consumer demands and provide the marketplace with quicker, more efficient ways to meet printing or publishing needs. Two of the more pertinent U.S. Patent disclosures describing web-based network methodologies for providing consumers of printed matter with quicker, more efficient ways to meet consumer demands are described hereinafter.

U.S. Pat. No. 6,611,349 ('349 Patent), which issued to Vogt et al., discloses a System and Method of Generating a Printing Plate File in Real Time using a Communication Network. The '349 Patent teaches a printing and publishing system which generates a printing plate ready file from data provided remotely in real time using a communication network. The printing and publishing system includes a central service facility and an end-user facility and/or a printing company facility. The end user facility provides page building operations allowing the design and construction of pages from images, text, and data available via the communication network. The central service facility provides storage, file processing, remote access, and content management operations. File processing operations include generating a plate-ready file from pages designed at the end user facility. The plate-ready file has a file format capable of high resolution and is ready for creation of a printing plate. The printing company facility provides printing operations for producing a printing plate from the plate-ready file.

U.S. Pat. No. 6,738,155 ('155 Patent), which issued to Rosenlund et al., discloses a System and Method of Providing Publishing and Printing Services via a Communications Network. The '155 Patent teaches a printing and publishing system providing prepress, content management, infrastructure, and workflow services to system subscribers in real time using a communication network. The printing and publishing system includes a central service facility and an end-user facility and/or a printing company facility. The end user facility provides page building operations allowing the design and construction of pages from images, text, and data available via said communication network. The printing company facility provides imposition operations allowing the setting of pages on a particular plate as well as positioning and orientation of pages on said plate. The central service facility provides storage, file processing, remote access, and content management operations. Content management operations include the capture, organization, archival, retrieval, and reuse of electronic files containing any one of text, graphics, photos, artwork, full pages, audio, video, and completed projects. Content management operations further include the organization and cataloging of file content for browsing, searching, and retrieving of files and data.

From a review of these prior art disclosures and from a general consideration of other pertinent prior art generally known to exist, it will be seen that the prior art does not disclose a web-based or network-based system for providing plate-ready digital files comprising branded portions and offering portions wherein the branded portions are controlled by a singular, ubiquitous source of control and wherein the offering portions are controlled by a plurality of localized control sources on an as-needed basis. In this regard, it is noted that brand integrity often suffers unintentionally when brand owners have geographically-spaced licensed operators, each of whom has localized business concerns and who may make otherwise seemingly unfettered use of a designated brand or trade dress. If proper control over the use of a mark or brand is weak or unstructured, the mark's or brand's value as a reliable source identifier of a particular product or service wanes. Indeed, in an extreme case, where a mark or trade dress is used without adequate control, restriction, or supervision, the mark or trade dress may be considered or construed as having been abandoned by its owner and thus free for others to use.

Brand integrity is thus of paramount importance and value to brand owners as a reliable source identifier of a particular product or service and thus a need continually exists to ensure brand integrity in the printing/publishing industry. Printers or publishers in various locales receive orders for printed matter bearing brand information via localized licensed operators. Neither the printer nor the localized licensee may fully realize the import of maintaining brand integrity and thus the brand owner may suffer a loss in intellectual property value if measures are not taken to preserve the value inherent in branded printed matter.

As is noted in the '155 Patent, the steps for producing printed materials using a plate process include (1) preparing copy elements for reproduction, (2) prepress production, (3) plate making, (4) printing, and (5) binding, finishing and distribution. In this printing production process, an "end user", such as, publishers, direct marketers, advertising agencies, and corporate communication departments, prepares copy elements for reproduction. In this "design" stage of the printing process, the end user provides images and data using slides or computer files to create one or more "pages". Pages can be designed using computer programs such as QUARKXPRESS or other publishing software packages. Slides or computer disks containing pages to be printed have traditionally been sent via a carrier to be prepared for creation of a plate.

In the prepress production stage, the end user input (or "copy") is transformed into a medium that is reproducible for printing. Typically, prepress involves typesetting, illustration, page building and design, image capture, image color correction, file conversion, RIPing, trapping, proofing, imposition, filmsetting, and plate setting. "Proofing" involves producing a proof, or sample, of what the printed product will look like. The proof is sent by mail or express carrier to the end user for review and approval. After alterations are made, new proofs are sent to the end user. Once approval of the proof is given by the end user, a medium, such as a computer to plate (CTP) file is produced and sent to the printer. "Imposition" involves the set of pages on a particular plate as well as their positioning and orientation. Imposition is particularly important in the creation of booklets or catalogs, where pages are positioned using register marks to assist in the stripping, collating, and folding of the printed product. In the plate making stage, a "printer" manufactures a printing plate using the medium created during prepress. Where a CTP file is used, the printer converts the CTP file into a printing plate or goes directly to a digital press. In the printing stage, the printer uses the printing plate to create the printed product. In the binding, finishing and distribution stage, the printed product is prepared in its final form.

SUMMARY OF THE INVENTION

It is an object of the present invention to provide a means for controlling a branded printed message (such as an advertisement) in a cost effective manner when multiple users and locations are involved. The system and method of the present invention enables individuals at multiple locations access to branded and controlled elements at the same time in a controlled environment.

The invention is essentially a system and method for protecting an organization's branded message. The methodology allows for personalizing, finalizing, publishing and delivery of web-based or web-constructed branded print-ready templates. This solution allows for digital distribution of: text, data, images and sound. Utilizing web-based personalized templates the originator can control each template including content and all aesthetic elements.

These controlled templates can be used by any organization in education, marketing support materials, advertisements, or virtually any printable message. The organization can provide password access to multiple users. This system provides ability to personalize and edit certain areas of the controlled message. Multiple users can operate the system at the same time. Once personalized, the message or document can remain digital for further analysis or print, or be output as a print ready or plate ready digital file. It can also be distributed in a digital form. This system requires limited or no training to produce final quality controlled messages from a basal support system or platform that otherwise requires extensive skill or training.

The system thus can monitor and generate reports by facility, by item, or by individual transaction. The system provides a dynamic management tool for branded items by providing proofs, scheduling, distribution and publishing of printable branded documents. An authorized individual can introduce and control information gaining economies of scale for replenishment of said items. The methodology, comprising a web-based server environment, enables organizations with multiple locations access while controlling the branded message.

Objects of the invention thus include a desktop publishing system and methodology that (1) requires minimal instruction and/or training and is easy to use; (2) allows user to access and personalize template documents; (3) maintains branding standards; (4) maintains legal content requirements; (5) creates and maintains any unregistered trade dress, including an organization's look, style, and quality as presented in marketing material; (6) updates and distributes a marketing message in real time to multiple facilities; (7) saves money in reduced time for production and publishing of digital images; (8) allows multiple users from multiple locations to simultaneously access library elements; (9) enables the generation of reports such as order history by facility, item, volume, et cetera; and (10) enables the combination of multiple, smaller localized orders into a single larger order.

To achieve these and other readily apparent objectives, the present invention provides an on-line publishing portal (OPP) or web-site. The process starts by prompting the user to login to the OPP. After the user inputs login data, the system authenticates the user. If the user provides valid credentials, the user is taken to the main page of the OPP. The user, at the main page of the OPP, is provided with a number of prompts. One such prompt is a "create document" prompt and when selected by the user operates to provide a selection of document templates broken into categories or groupings based upon document type.

The system then queries whether the selected document requires an organizational listing to be added to it. If the selected document does indeed require an added organizational listing, the user is directed to a page where he or she is prompted to select an organizational group and select a typesetting style to use for the organization group in the document. The system then creates the new document from the document template the user selected.

The user is then prompted by a document editor page in which he or she is shown a preview of the document and where editable and interchangeable elements of the document are highlighted for the user to change. At any point during the editing process the user can review the document in Portable Document Format (PDF). Once the user has changed all the parts they wish to the user can select to finalize the document which checks the document for errors and displays errors found so that user can correct the same. If the document passes finalization the user can then publish the document, if not they will have to make additional changes until it can pass finalization.

To publish a document the user must select a publication to which to send the document. Typically, the publication is a newspaper, but notably can be any company that uses digital print ready files and can receive them electronically. The user fills in additional details that are to be sent along with the file known as an insertion order. The additional information is sent via email while the digital print ready file is sent via electronic means as required by the consumer of the publication or consumer of the file. A conformation email can also be sent to the user.

Other objects of the present invention, as well as particular features, elements, and advantages thereof, will be elucidated or become apparent from, the following descriptions and the accompanying drawing figures.

BRIEF DESCRIPTION OF THE DRAWINGS

Other features of our invention will become more evident from a consideration of the following brief description of our patent drawings:

FIG. 7 is a screenshot depicting a "create new advertisement" page of the OPP comprising four macrotemplates.

FIG. 8 is a screenshot depicting a "select market sig set" page of the OPP showing a preview styles prompt.

FIG. 9 is a screenshot depicting a "market sig set" page of the OPP showing previewed styles.

FIG. 19(a) is a top half of a screenshot depicting a "publish advertisement" page of the OPP showing publication details, billing details, and designer details prompts.

FIG. 19(b) is a bottom half of the screenshot shown in FIG. 19(a) depicting advertisement details, advertisement delivery, and advertisement delivery (continued) prompts.

FIG. 20 is a screenshot of an advertisement details page of the OPP depicting published advertisement details.

DETAILED DESCRIPTION OF THE PREFERRED SYSTEM AND METHOD(S)

Figure 1:
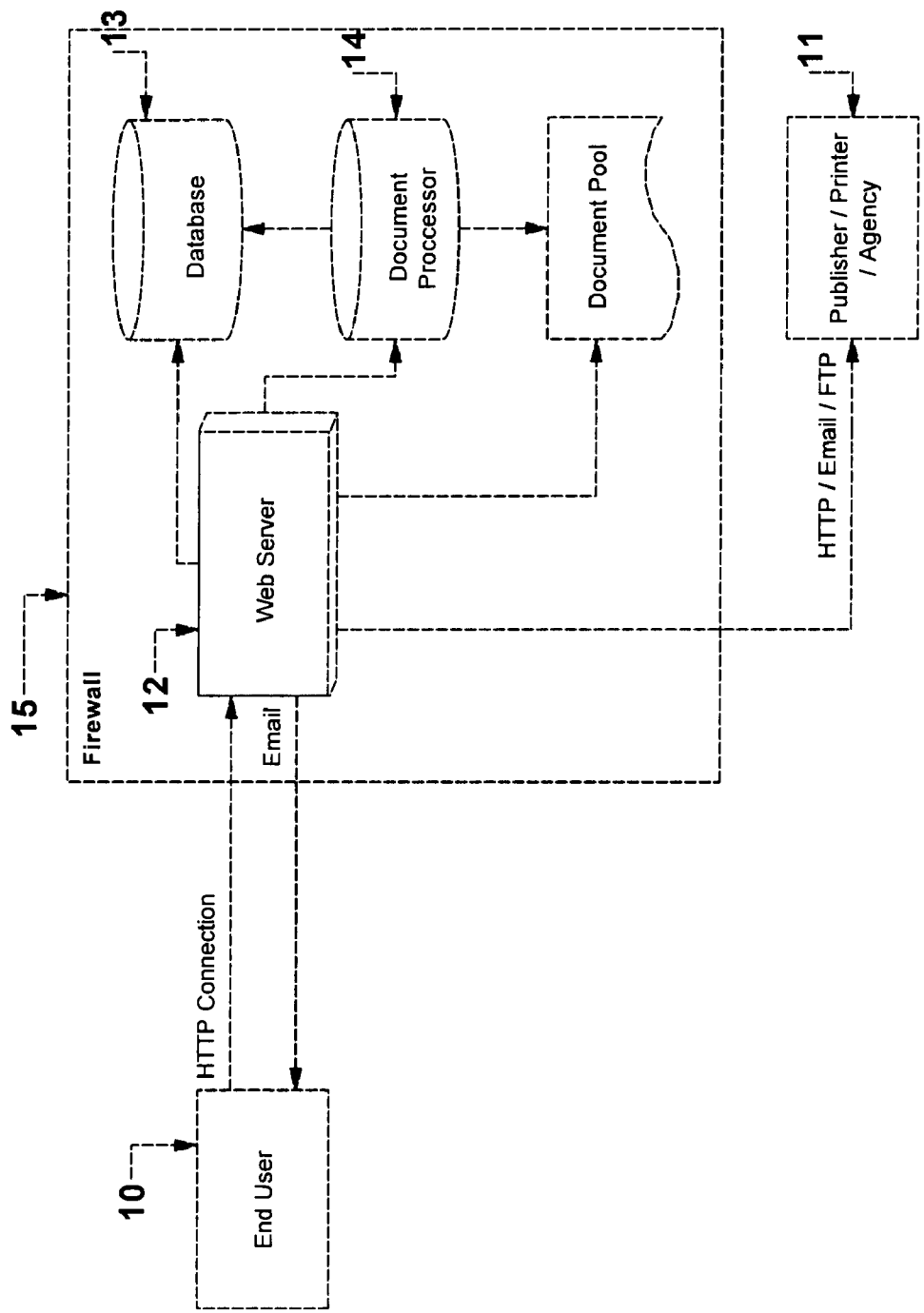
FIG. 1 is a flowchart diagram depicting a high-level overview of how the system links to the end user and consumer of the final documents.

Referring now to the drawings, the preferred embodiment of the present invention concerns a system and method for controlling brand integrity upon printed matter generated in a network environment. In other words, the present invention discloses a system or method for conveying high integrity branded messages to viewers or recipients. FIG. 1 is a flowchart diagram depicting the relationship between the participants of the system, including the end user as referenced at 10 and the document consumer as generally referenced at 11. FIG. 1 thus depicts the links between the web server 12 of the disclosed system that stores the program logic, the data stores 13 that hold the program data, and the document processor 14 that generates the print ready documents and previews. The document consumer of the documents could be a printer, publisher or similar other agency as further indicated at 11. Notably, the web server is further preferably protected by a firewall as referenced in broken lines at 15. The end user 10 is linked to the web server 12 by a forward HyperText Transfer Protocol (HTTP) connection and a return email connection as supported by standard email protocols.

Figure 2:
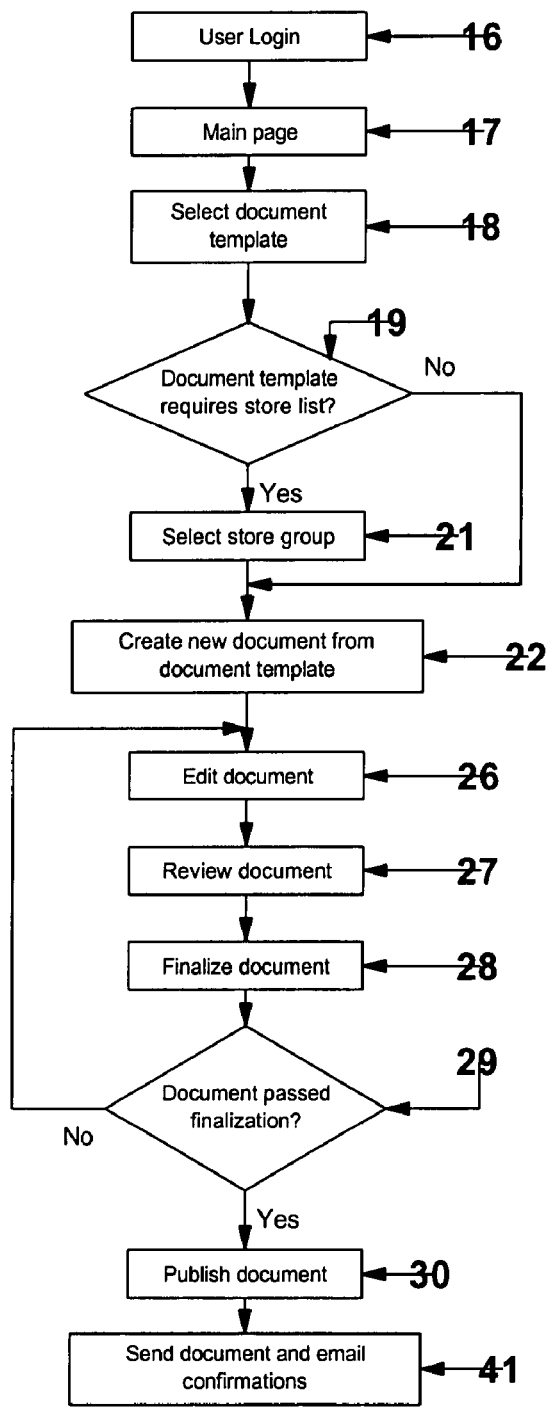
FIG. 2 is a flowchart diagram depicting a high-level overview of the workflow for which the system is designed.
Figure 6:
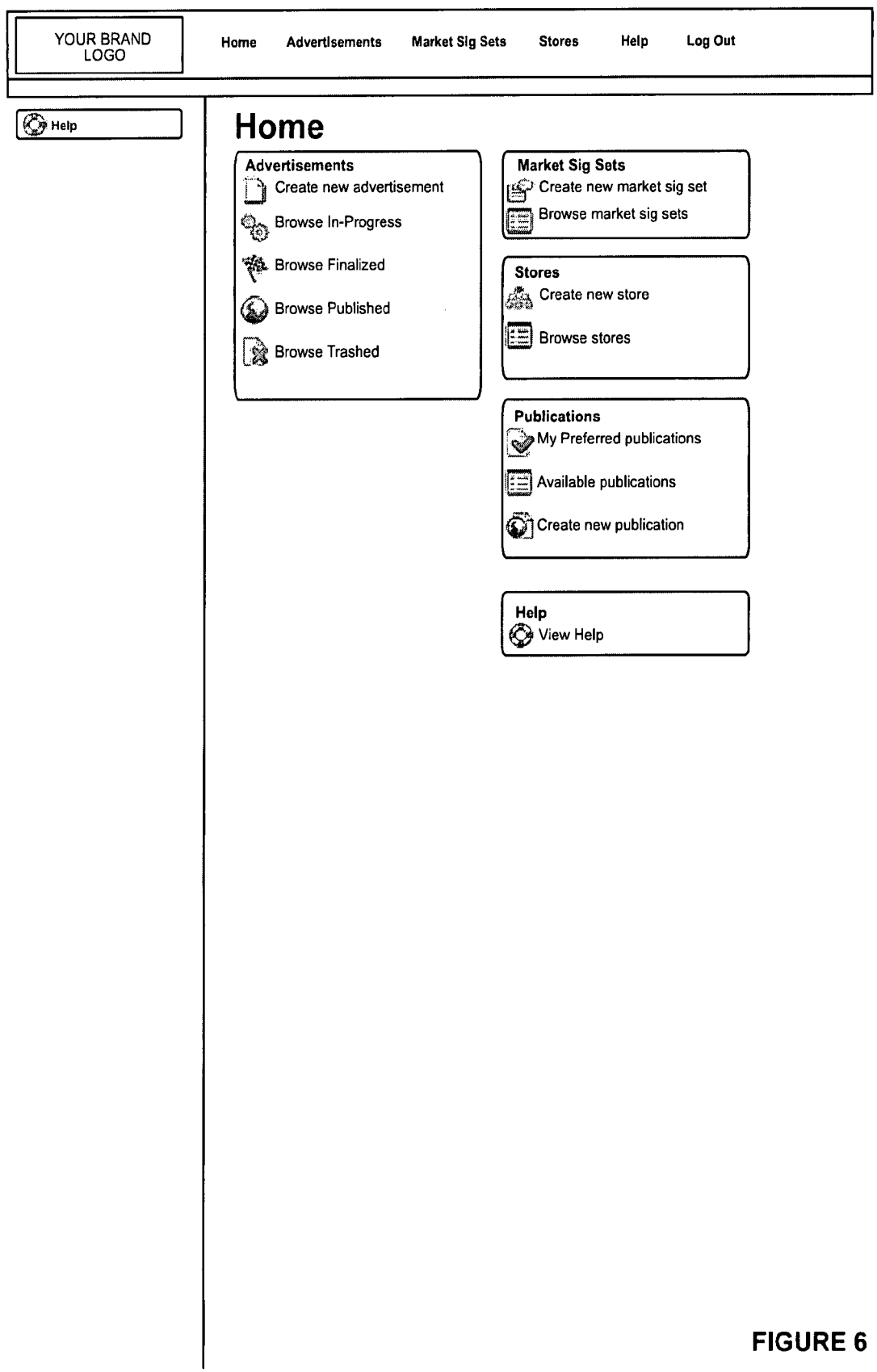
FIG. 6 is a screenshot depicting a home page of an online publishing portal (OPP) for a specific brand owner showing links to sections entitled: advertisements, market sig sets, stores, publications, and help.

FIG. 2 is a flowchart diagram depicting a high-level overview of the workflow for which the system is designed. It will be seen from an inspection of FIG. No. 2 that the diagram begins with a user logging into the system as referenced at 16. Once the user's credentials are authenticated (via an authentication process as outlined in FIG. 3), the user is directed or brought to the home or main page 17 of the web site or online publishing portal, an example of which is generally depicted in FIG. 6. The user may then opt or select a create a document prompt (as referenced at 23 in FIG. 4(a)), whereafter a new document page is displayed (as referenced at 24 in FIG. 4(a)), and is shown a screen of a plurality of document templates 25, which step is referenced in FIG. 4(a) and which document templates are broken down into categories based on document type as generally depicted in FIG. 7. The user may then select a document template or macrotemplate from the selection list and by doing so create a new document (as referenced at 18 in FIGS. 2 and 4(a)) from the selected macrotemplate as exemplified by the macrotemplates 20 branded with the mark FIRESTONE and other related trade dress (as owned or utilized under controlled license by BFRC Retail and Commercial Operations, LLC, having an office at 333 East Lake Road, Bloomingdale, Ill., 60108) as generally referenced in FIGS. 7, 10, 11, 13, and 16.

Figure 3:
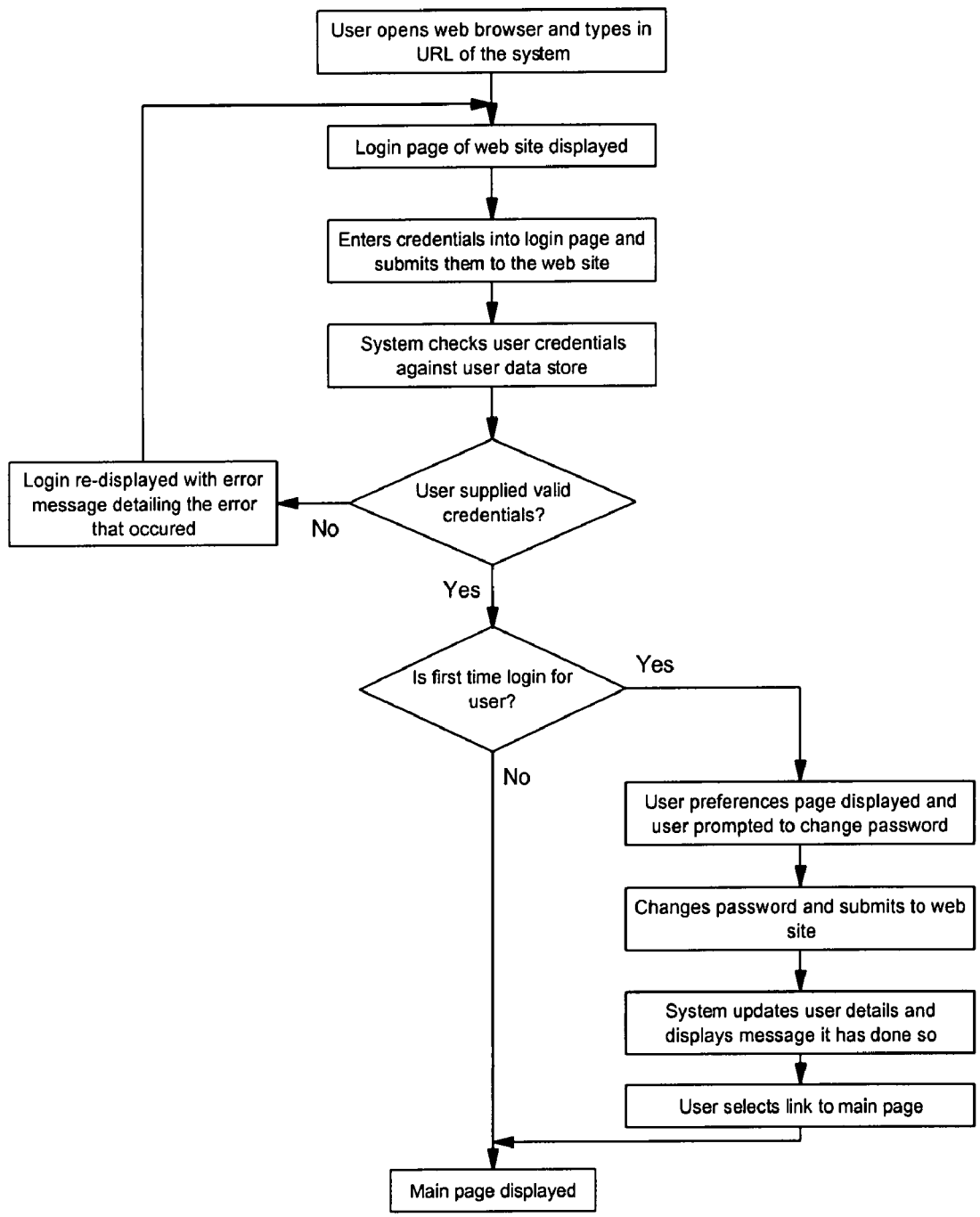
FIG. 3 is a flowchart diagram depicting the process of how a user is authenticated and logged into the system.

As earlier indicated, FIG. 3 generally outlines the user authentication routine contemplated by the present methodology. From an inspection of FIG. 3, it will be understood that the diagram details how a user is authenticated and then logged into the system. The diagram starts with the user opening up a web browser and typing the URL of the system's web site into the user's web browser (inputting data in the user's data input means or user interface), thus entering the online publishing portal. Once the web browser finds the site, the user is shown the login page upon which they are prompted to enter their login credentials. The user enters his or her login credentials and submits them to the web site for verification. Once the user submits the details the system checks a precompiled user data store for the user and verifies that the credentials the user supplied are correct. If the credentials the user supplied are not correct the user is taken back to the login page and shown an error message detailing the error that was encountered and possible resolutions to it. If the user supplied valid credentials and it is not the user's first login then they are taken to the main page of the system's web site, an example of which is depicted in FIG. 6. If the user supplied valid credentials and it is the first login for the user then the user is taken to the user preferences page and asked to change their password. Once the user changes their password and submits it to the web site they are shown a message that their details have been updated. The user can then navigate to the main page of the site via a link on the page.

Figure 4A:
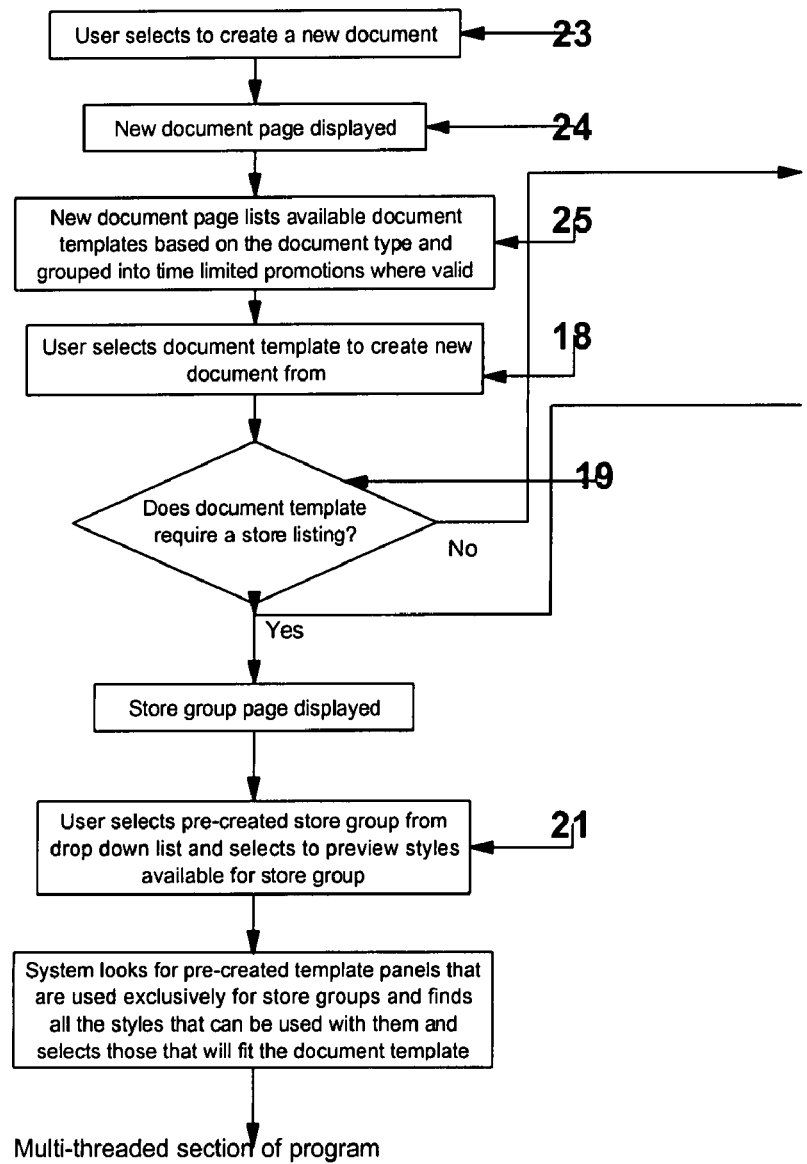
FIG. 4(a) is a flowchart diagram depicting the beginning process of how a new document is created.

It will be seen from a further inspection of FIG. 2 that a further step may include querying whether the selected macrotemplate or document requires a store (or other) listing to be added to the macrotemplate during the editing phase as generally referenced at 19 in FIGS. 2 and 4(a). If the macrotemplate requires a store (or other) listing, the user is directed to a page where he or she is prompted to select a store group from a group listing as generally referenced at 21 in FIGS. 2 and 4(a) and select a style to use for the selected store group in the macrotemplate-generated document as further generally indicated in FIG. 4(a) at 21. From an inspection of FIGS. 8 and 9 relating to market sig set and style selection, the reader will note that in the exemplary screenshots, the selection of market sig sets is analogous to the selection of store group as here specified. For the selected market sig set in FIGS. 8 and 9, namely, "Test 1", four style prompts are displayed thereunder from which the user may select a styling.

Figure 4B:
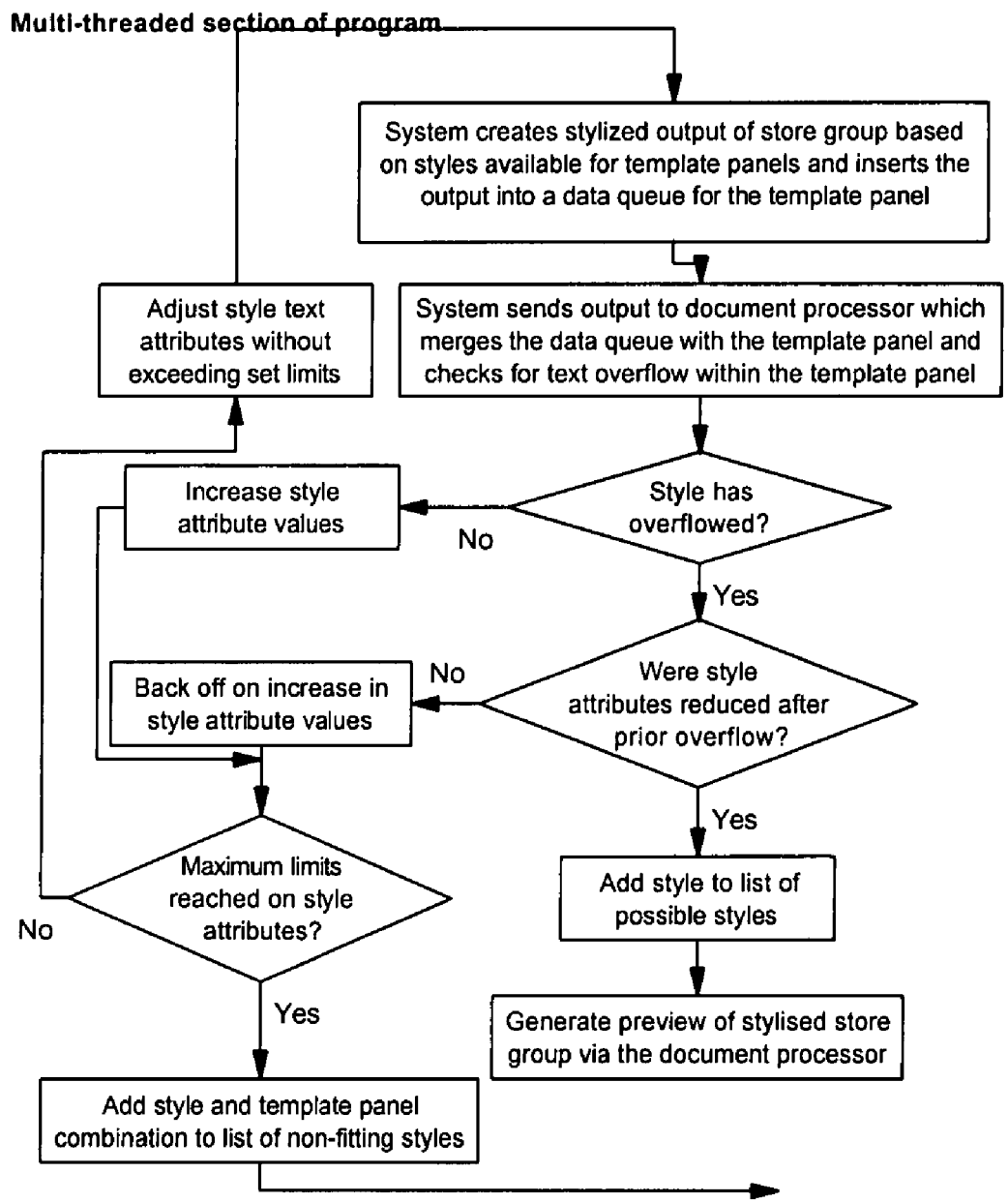
FIG. 4(b) is a flowchart diagram depicting the intermediate process of how a new document is created.
Figure 4C:
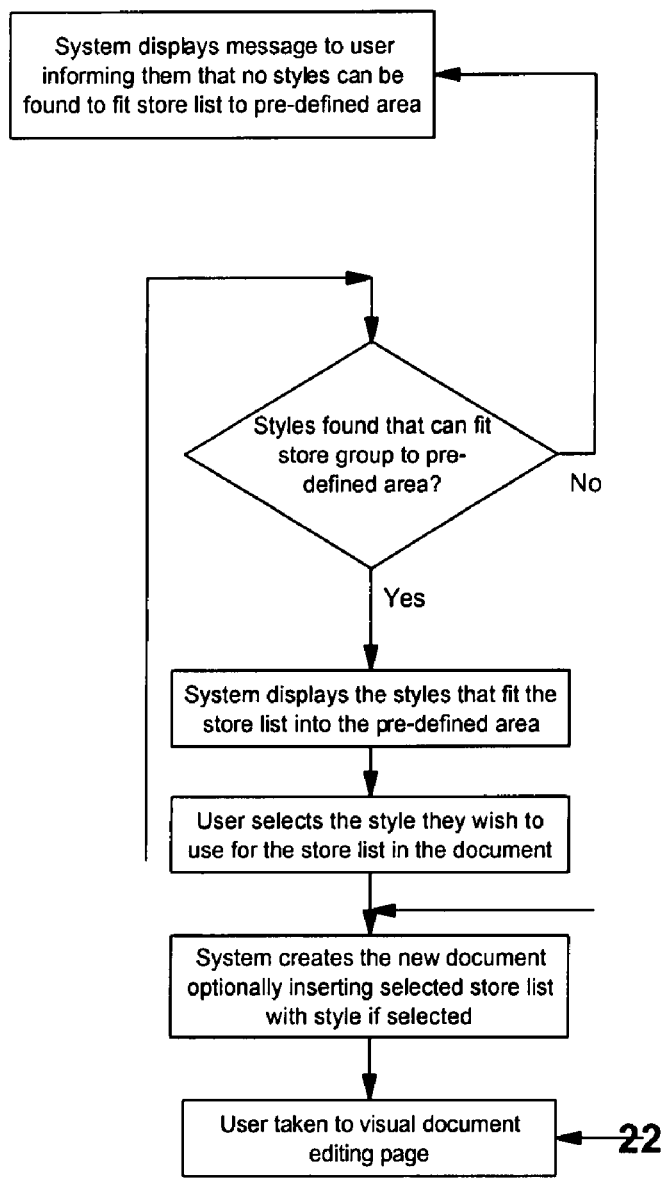
FIG. 4(c) is a flowchart diagram depicting the ending process of how a new document is created.

FIGS. 4(a) through 4(c) are to be considered in tandem as depicting the "create a new document" routine. The diagram(s) thus details how a new document is created. It will be seen from an inspection of the diagram that the routine begins with the user selecting a link to create a new document from a page within the system's web site. After selecting the link, the user is taken to the new document page upon which the user may be shown a list of document template categories (at the side of the display screen) and a list of document templates (in the main or central part of the display screen). The templates may be grouped for ease of use. Advertising-type templates, for example, may be grouped into time limited promotions where valid.

The user selects a document template and may opt to create a new document from it. If the document template requires a store list to be selected then the user is taken to the store groups' page where the user is asked to select a store group to use in the document. The user selects a store group and clicks the preview button. The system takes the store group and document template the user wishes to use; looks for pre-created template panels that are used exclusively for store groups; finds all the styles that can be used with the template panels; and selects which template panels can fit within the pre-defined area within the document template. The system then loops through the styles for each template panel creating stylized output for the store group, by applying copy-fitting rules to adjust attributes of the text such as line leading, font size and tracking. The output is then inserted into a data queue linked to the template panel.

The system then sends the output to the document processor, which merges the data queue with the template panel and checks for overflow of text within the template panel. If the stylized output did not overflow the textbox of the template panel then the text style attributes values are increased for the style and the output is reinserted into the data queue for the template panel. If the limits of the text attributes are reached with or without an overflow change then the system marks the template panel and style combination for that store list as non-fitting. That information is then recorded in the data store so that the same combination of style, template panel and store group is skipped if it occurs again for another document.

If the stylized output did overflow the text box within the template panel then the text style attribute values are reduced for the style and the output is reinserted into the data queue for the template panel. If the style attributes had been reduced due to an overflow previously for the style and template panel and after an increase the style and template panel is overflowing again, then the text style attribute values are reduced and recorded in the data store as a successful fit for the style and template panel combination. If a successful fit is recorded, the system generates a preview of the style and store group combination using the document processor for the user to choose from. If no combinations of style, store group and template panel were found to fit the pre-defined area within the document template then a message is displayed informing the user that no such combinations were found and suggest alternative courses of action.

If combination of style, store group and template panel were found to fit the pre-defined area within the document template then the system shows the user the previews generated by the document processor. The user selects the style they wish to use for the store group from the preview displayed by the system. The system creates the new document. If the document template required a store group and the user selected a combination of style, store group and template panel that fit the pre-defined area within the document template, then the system adds this information to the data queue and a new version of the document is created by the document processor which includes the template panel in the pre-defined area within the document template. The stylized store group is also added to the data queue and merged each time a preview of the document is required. It will thus be understood that the present system discloses means for automatically copy-fitting information within certain text box parameters. In other words, the information is copy-fit within the text box parameters without manual typesetting by means of a routine as specifically set forth in FIG. 4(b) and heretofore described.

Figure 5A:
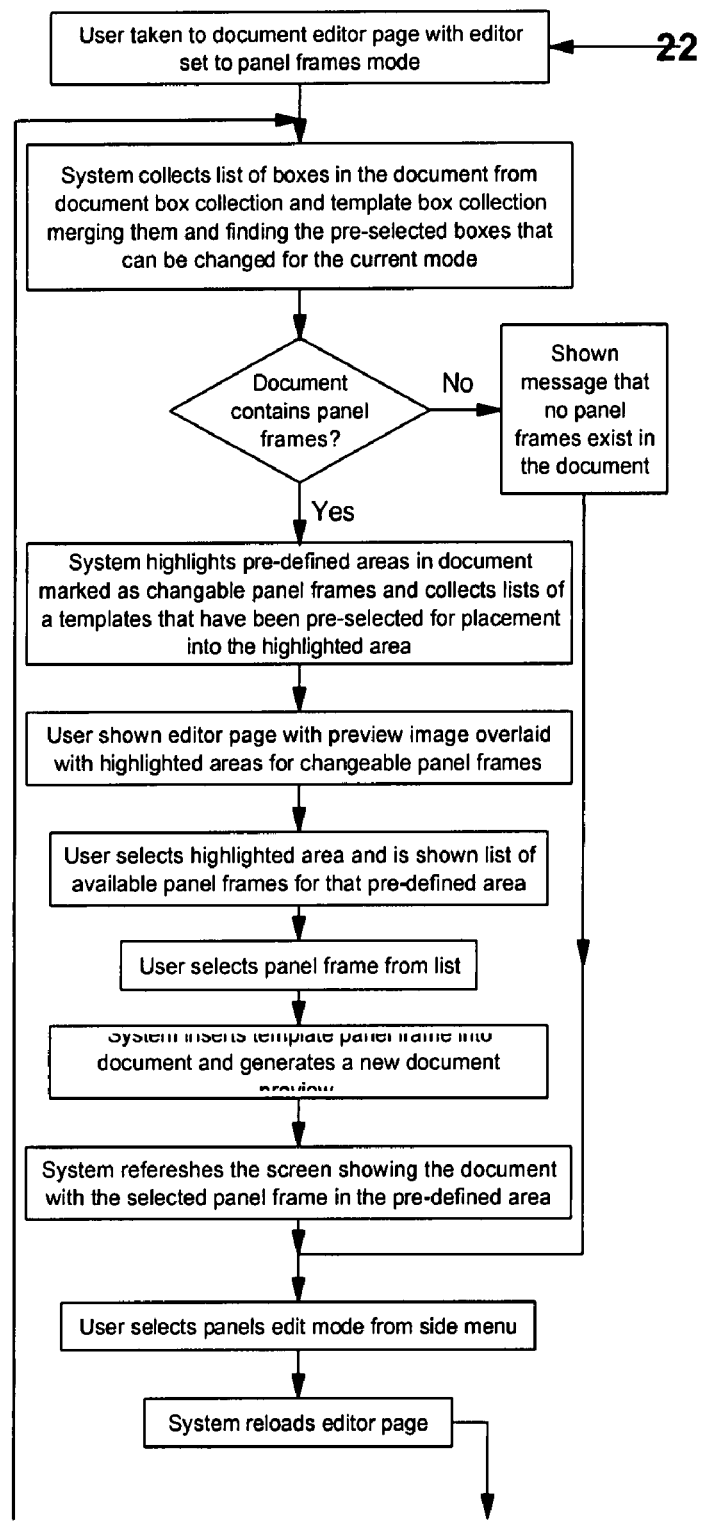
FIG. 5(a) is a flowchart diagram depicting the beginning process of how a document is edited in the visual editor.
Figure 5B:
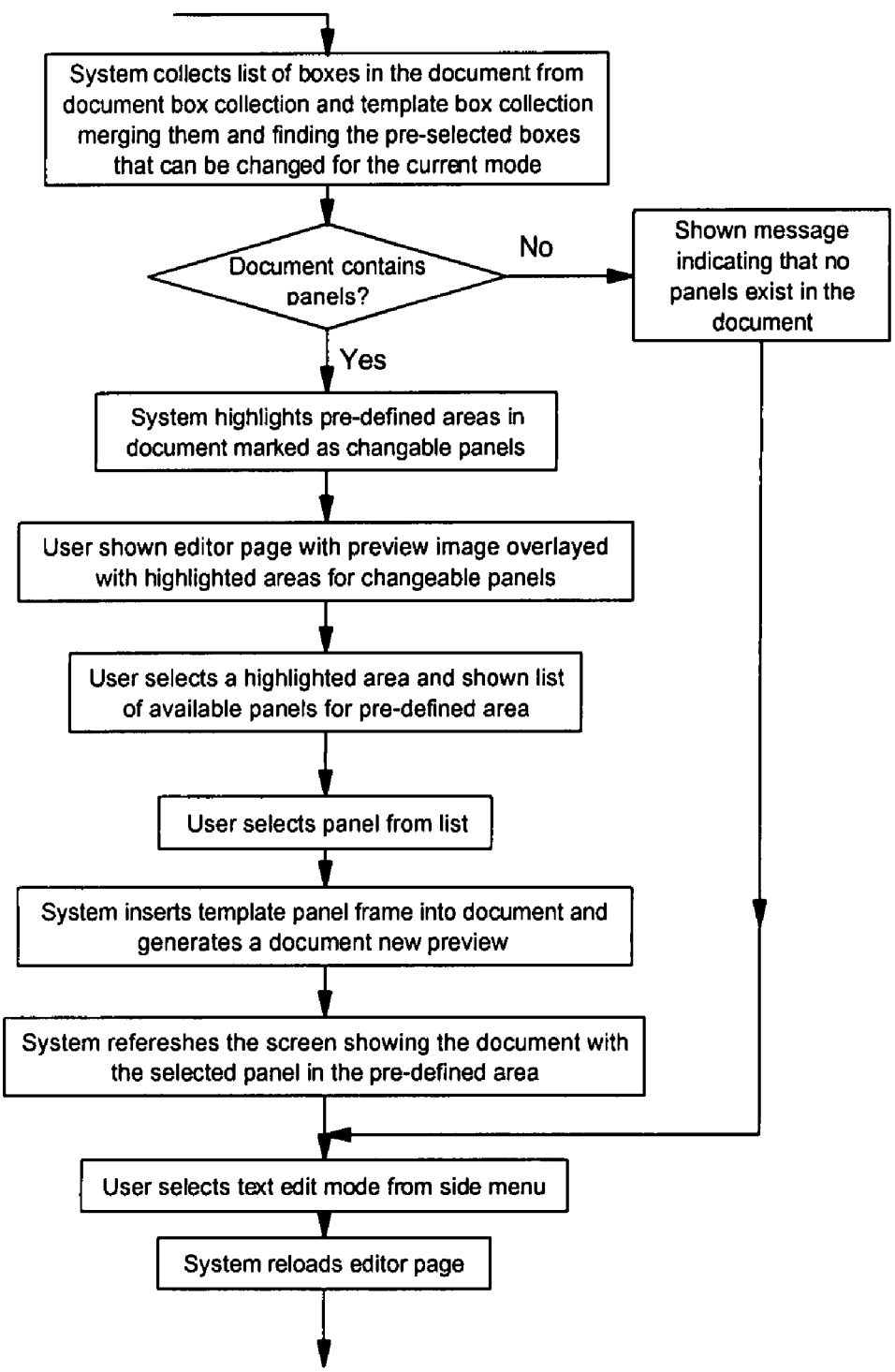
FIG. 5(b) is a flowchart diagram depicting the intermediate process of how a document is edited in the visual editor.
Figure 5C:
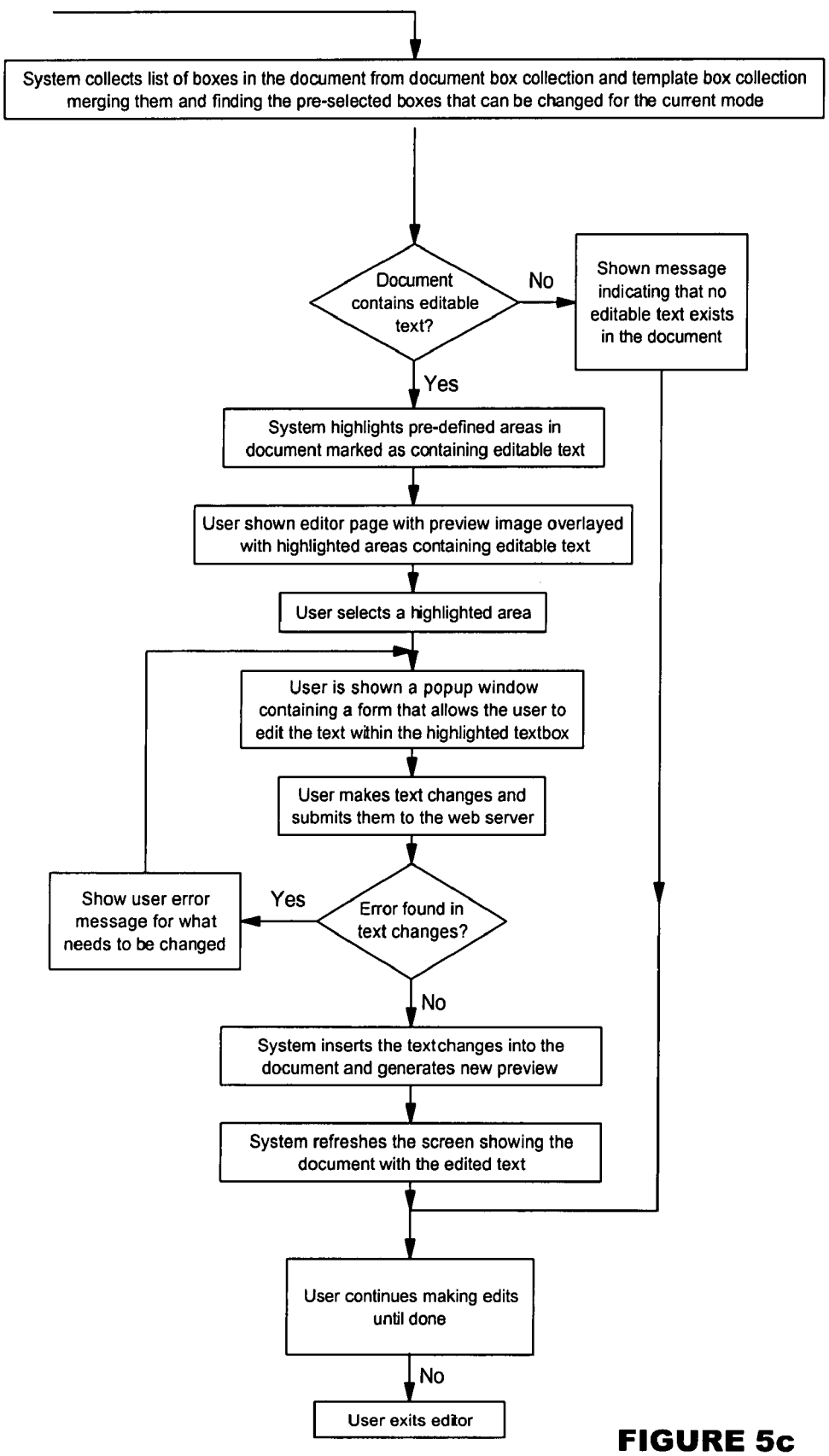
FIG. 5(c) is a flowchart diagram depicting the ending process of how a document is edited in the visual editor.

The system then proceeds to a visual document editing page for creating a new document from the macrotemplate the user previously selected. This step is generally referenced at 22 in FIGS. 2, 4(c), and 5(a). FIGS. 5(a)-5(c) outline the process of editing a macrotemplate, which process or routine is generically referenced at 26 in FIG. 2. The "edit a document" routine as enabled at the document editor page (generally depicted in FIGS. 10-14, and 16), shows the user a preview of the document; editable and interchangeable elements of the document are highlighted for the user to change depending on the user's clearance credentials as dictated during the authentication process. For low level users (i.e. users other than a designated brand comptroller), such as regional operators and the like, non-branded panels are highlighted so that these panels may be edited by the low level user. From an inspection of FIGS. 11-14, and 16, it will be seen that panels or microtemplates (shown in broken lines at) 35 have been highlighted in a first highlight color (such as yellow) to make the user more readily aware of those panels or microtemplates that may properly be edited. It is thus contemplated that the editable or alterable panels or microtemplates may be considered as "open access" templates or panels, accessible by users of both high level and low level security clearance credentials.

Panels that may not be edited by the user (such as branded panels or portions 36, or legal notice panels or portions 37, which may only be amended by designated users having high level security clearance credentials) do not become highlighted and cannot otherwise become altered electronically. Panels need not be branded or contain legal notices to qualify as unalterable. For example, other restricted access panels or portions 38 may include advertising messages or the like, as may be required by the user. Restricted access panels or portions 36, 37, and 38 are referenced in FIGS. 10-13, and 16. Notably, at any point during the editing process the user can review the document typically in a preferred portable document format (PDF) for output. The review step is referenced at 27 in FIG. 2.

Figure 15:
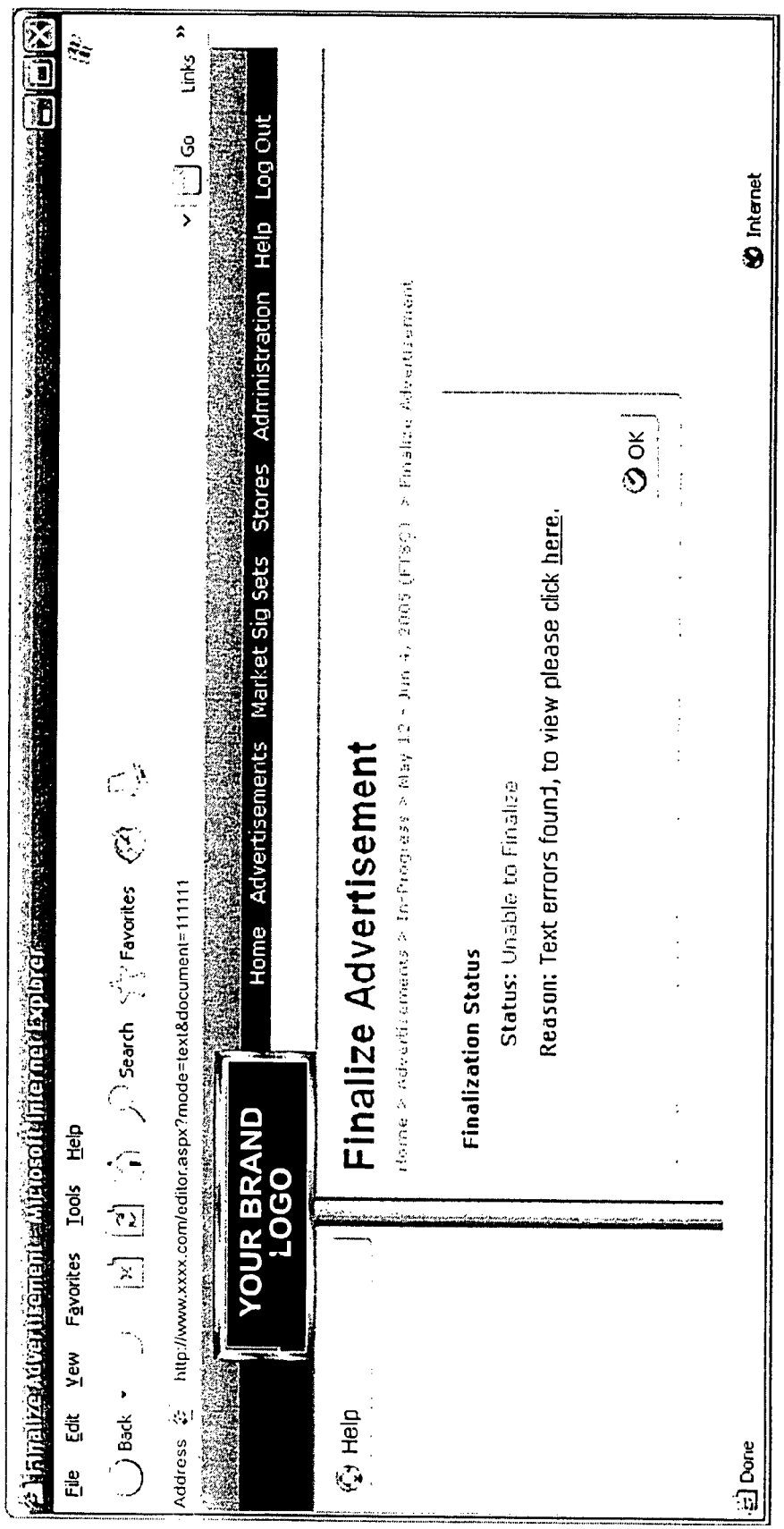
FIG. 15 is a screenshot depicting a "finalize advertisement" page of the OPP showing a text error prompt.

Once the user has changed all the parts they wish to, the user can select to finalize the macrotemplate-generated document, which step is generally referenced at 28 in FIG. 2. Further, FIGS. 15-18 generally depict exemplary screenshots involved with the finalization process. The finalization routine essentially checks the macrotemplate for errors as defined by rules written by or under the direction of the macrotemplate developer. For example, the developer may default pricing text to display a zero dollar figure such as "$0.00" or "$0.99" or a zero time of day such as "0:00 A.M." or "0:00 P.M." If the user fails to otherwise edit the "$0.00" or "$0.99" or "0:00 A.M." or "0:00 P.M." to an appropriate price or time for display (the pricing and timing parameters being defined per the instructions of the macrotemplate developer), the finalization routine will flag the error(s) firstly advising the user with an appropriate message such as depicted in FIG. 15. By opting to view the errors, the user is taken to a screen such as that depicted in FIG. 16.

Figure 16:
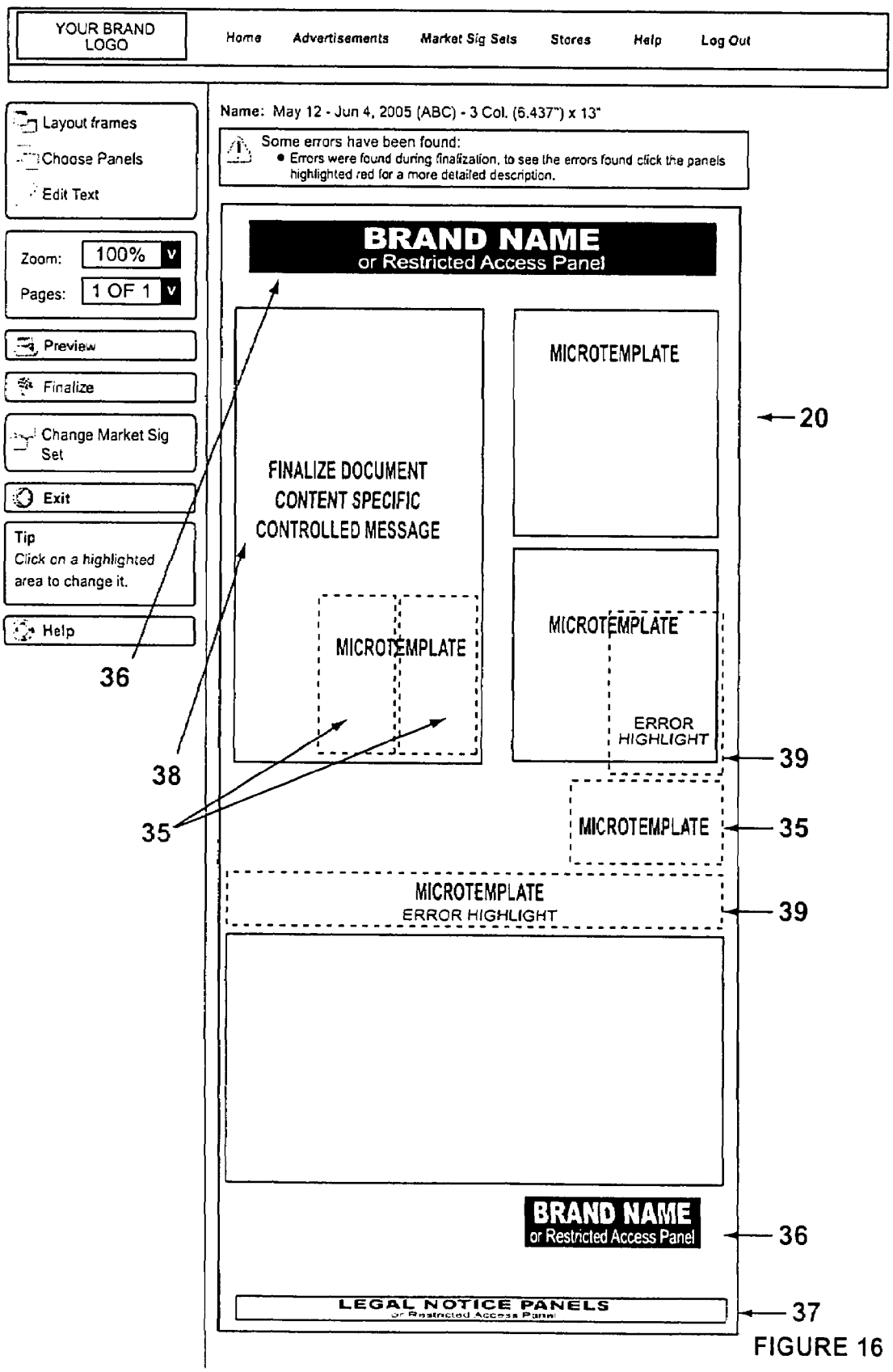
FIG. 16 is a screenshot depicting an editor page of the OPP showing highlighted editable panels containing errors.
Figure 17:
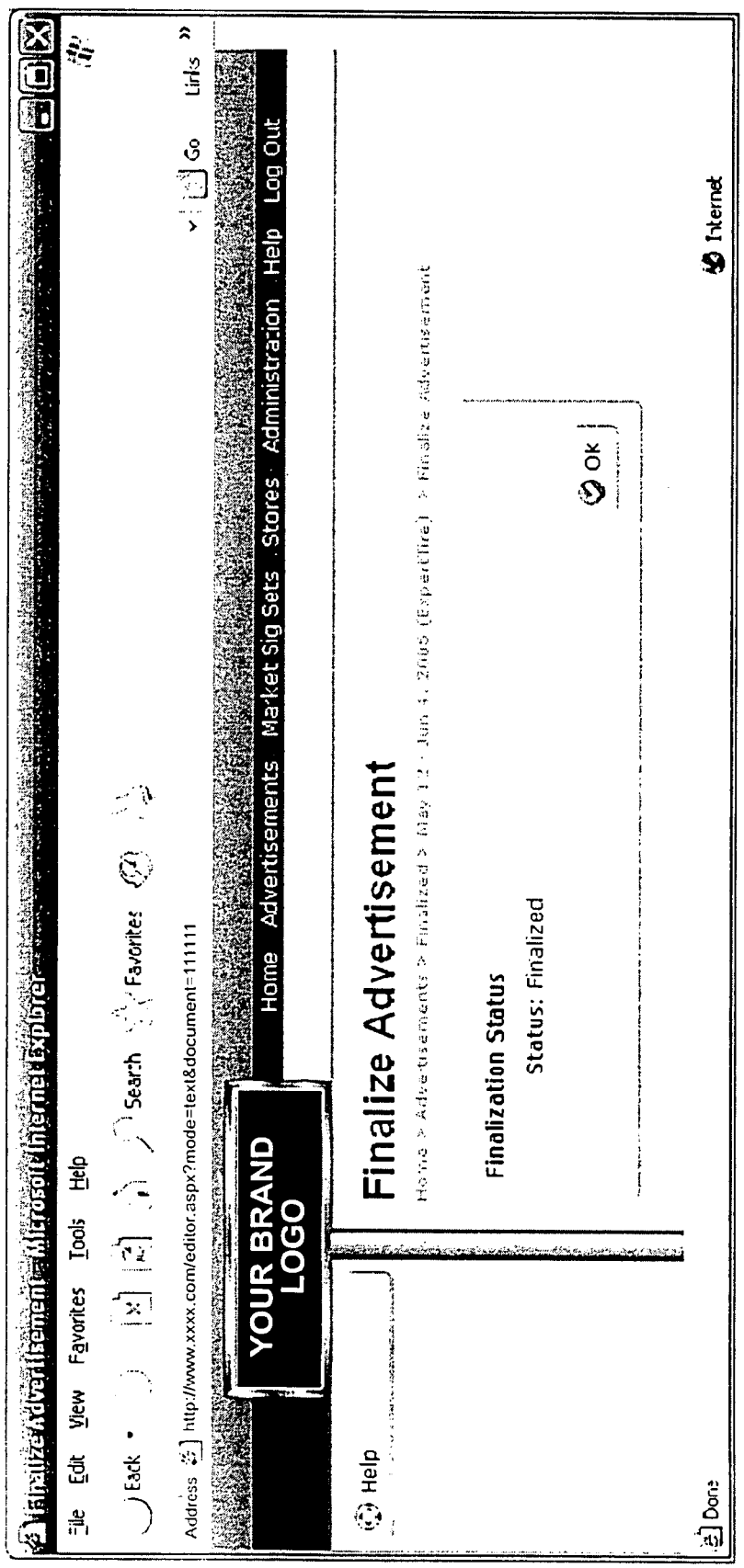
FIG. 17 is a screenshot depicting a "finalize advertisement" page of the OPP showing a finalized finalization status.
Figure 18:
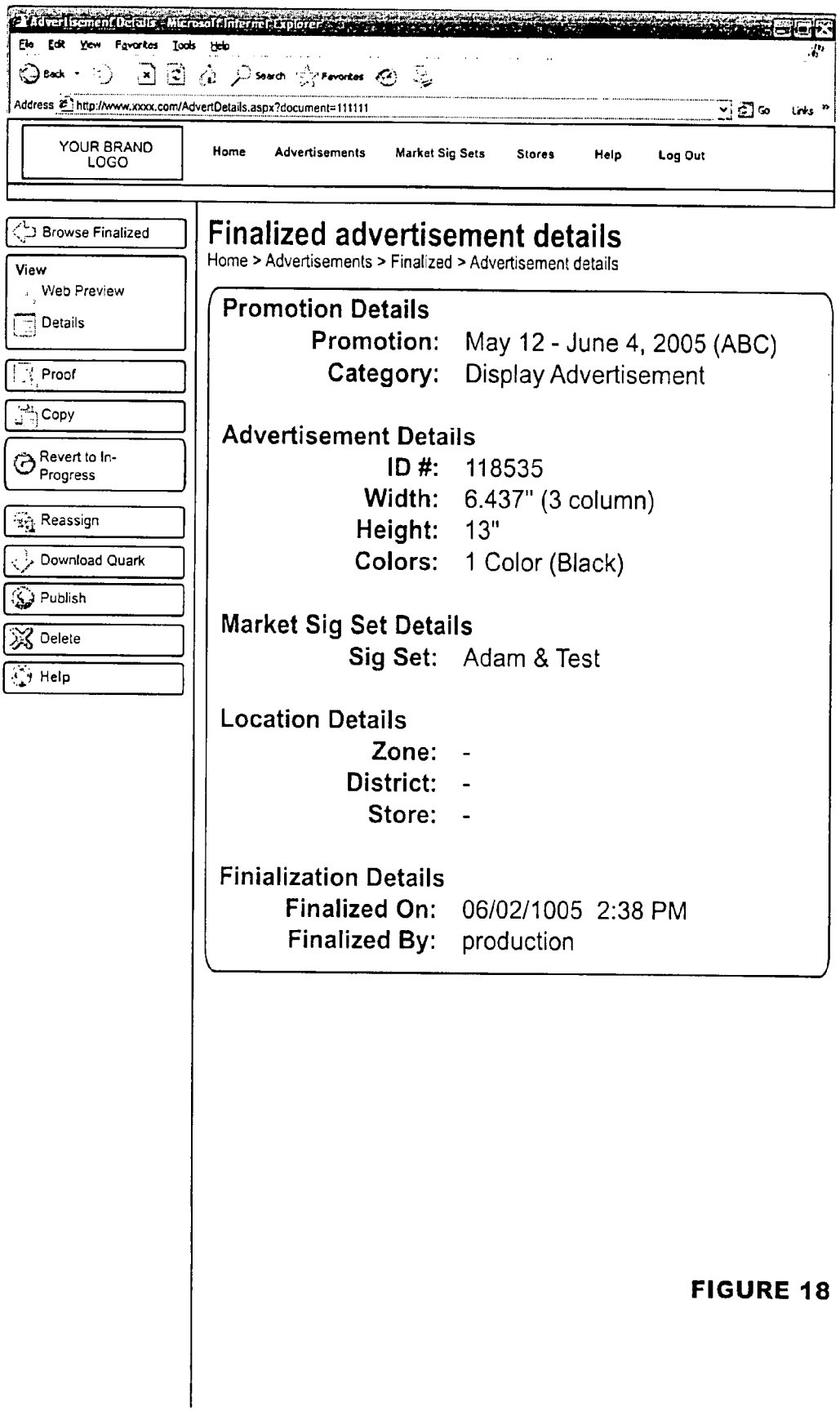
FIG. 18 is a screenshot depicting an advertisement details page of the OPP showing finalized advertisement details.

From an inspection of FIG. 16, it will be seen that the finalization routine flags the error(s) secondly highlighting the microtemplate with a second highlight color (such as pink) as generally referenced at 39 in FIG. 16. Thus, it will be understood that the finalization routine or step checks the macrotemplate-generated document for errors and displays the errors found so that the user may make the necessary amendments to correct them. If the macrotemplate-generated document passes the finalization routine, the user may preferably be advised of the same with an appropriate message as generally depicted in FIG. 17, whereafter the user can proceed to publish the brand-protected message, such as advertisement bearing brand or source identifier information. The routine query whether the macrotemplate-generated document passed finalization is referenced at 29 and the step or routine of publishing the macrotemplate-generated document is referenced at 30 in FIG. 2. If the document fails the finalization routine, the routine will loop until proper amendments to the document have been made. FIG. 18 is an exemplary screenshot depicting an advertisement details page of the OPP showing details of the advertisement as finalized with the finalization routine.

Figure 10:
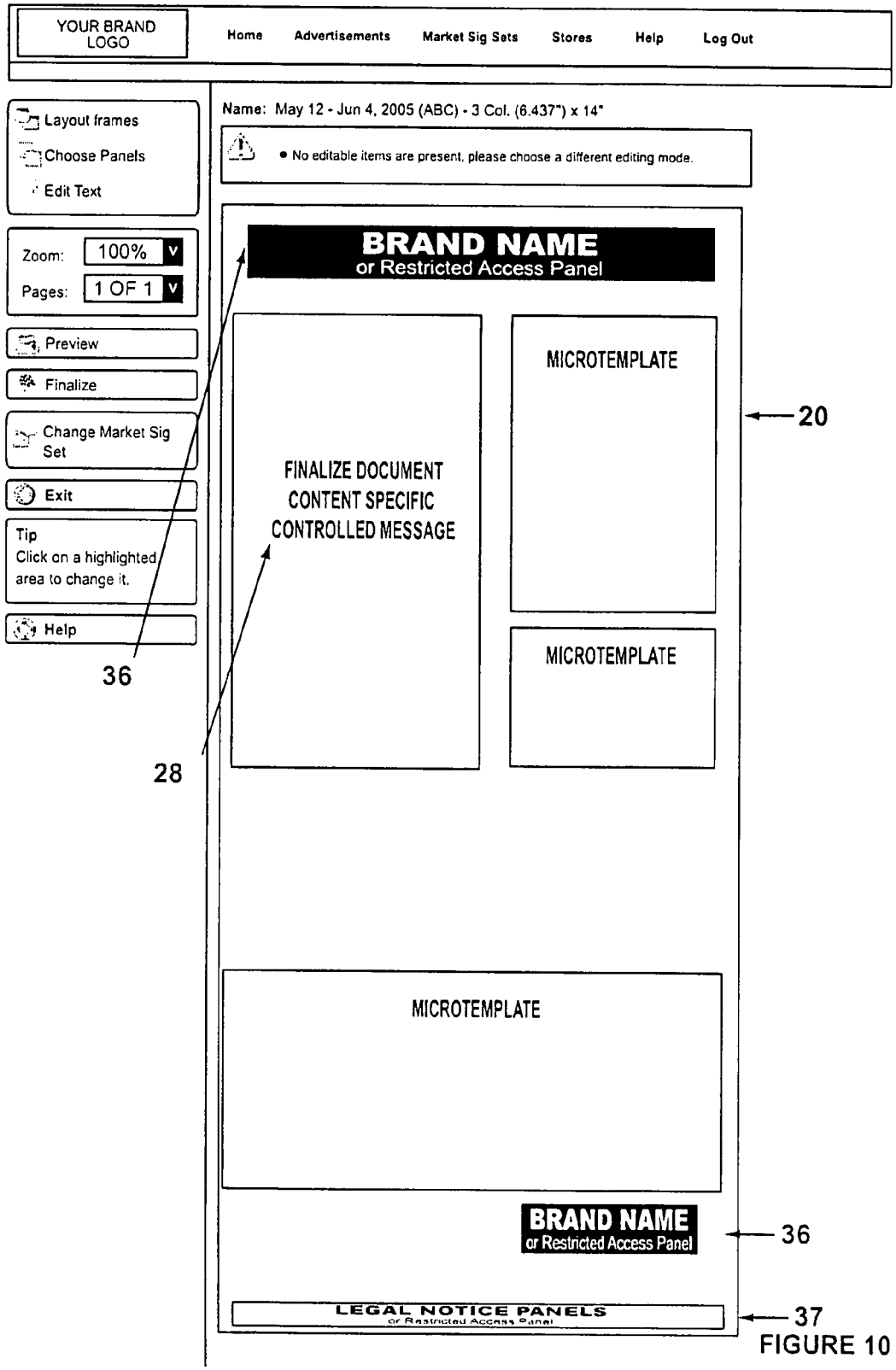
FIG. 10 is a screenshot depicting an editor page of the OPP showing a layout of the frames on the macrotemplate.
Figure 11:
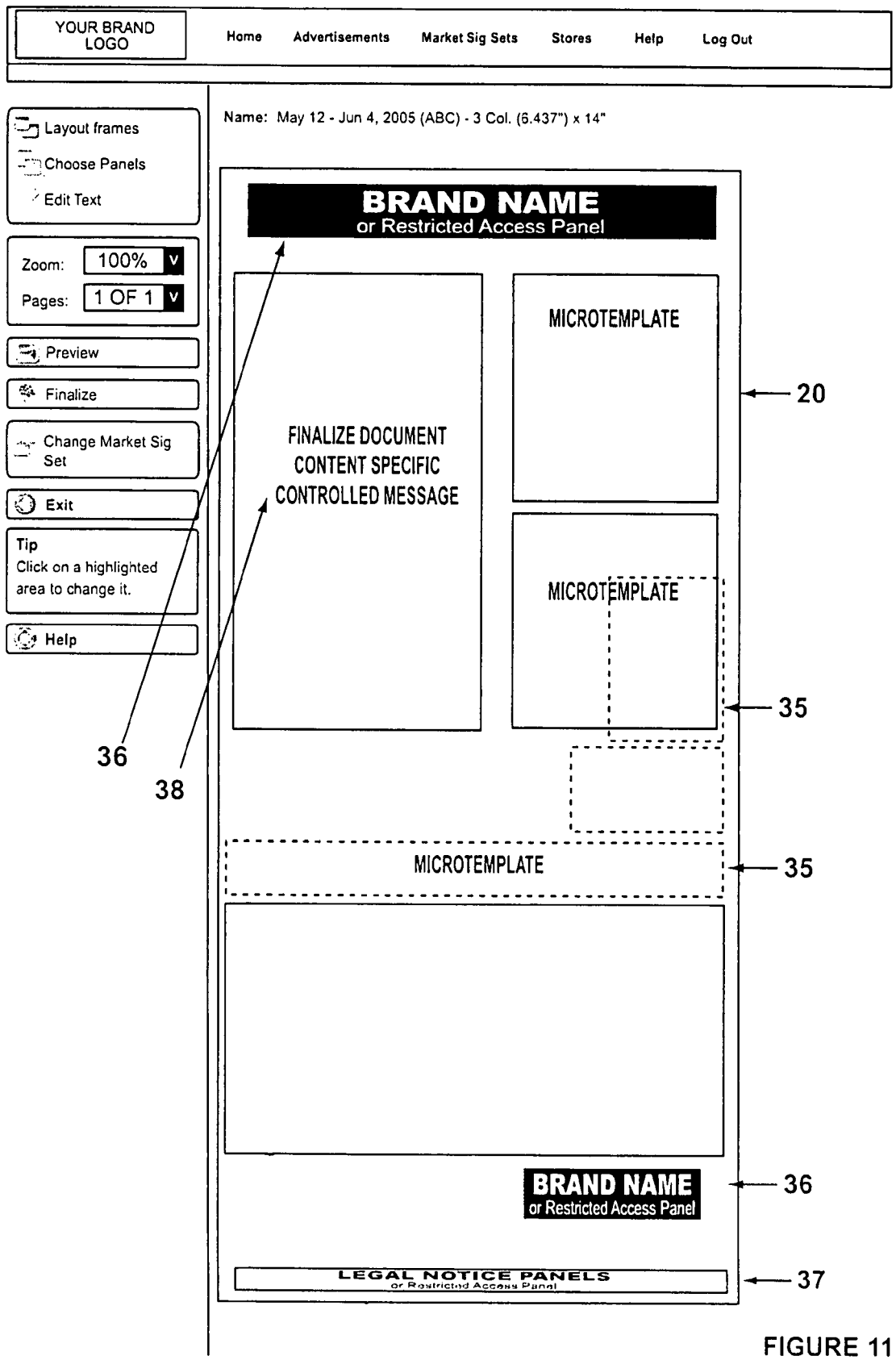
FIG. 11 is a screenshot depicting an editor page of the OPP showing a layout of the frames on the macrotemplate with highlighted editable panels.
Figure 12:
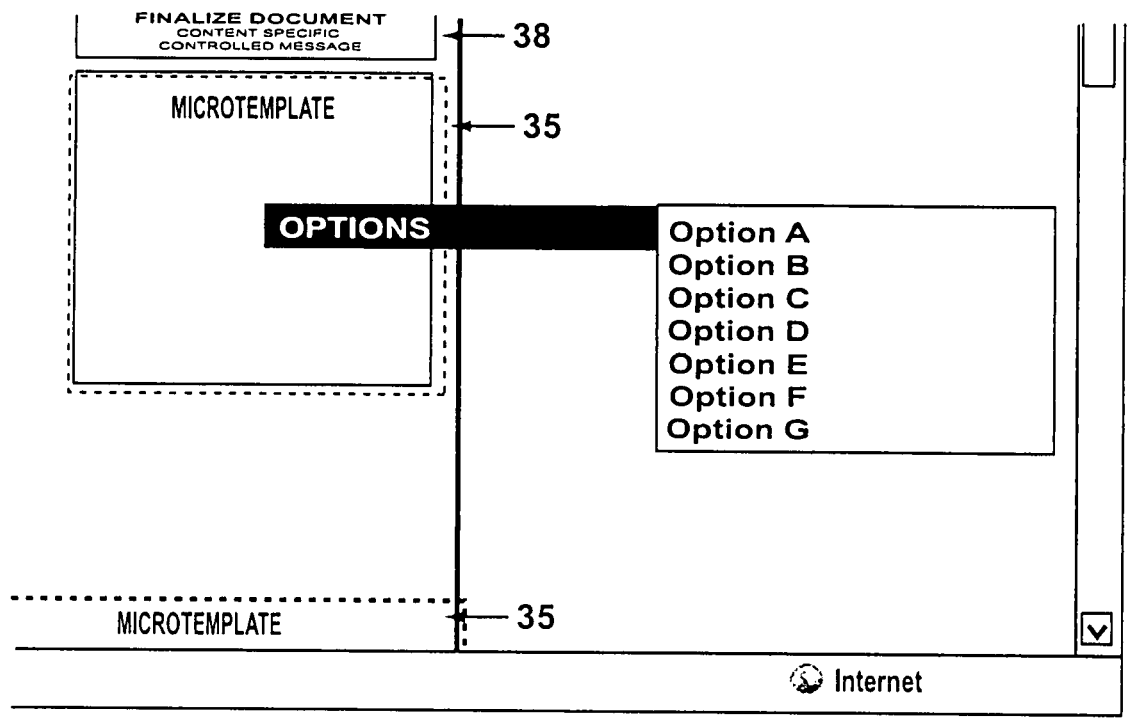
FIG. 12 is a fragmentary screenshot depicting a portion of an editor page of the OPP showing an editable message panel with edit options.
Figure 13:
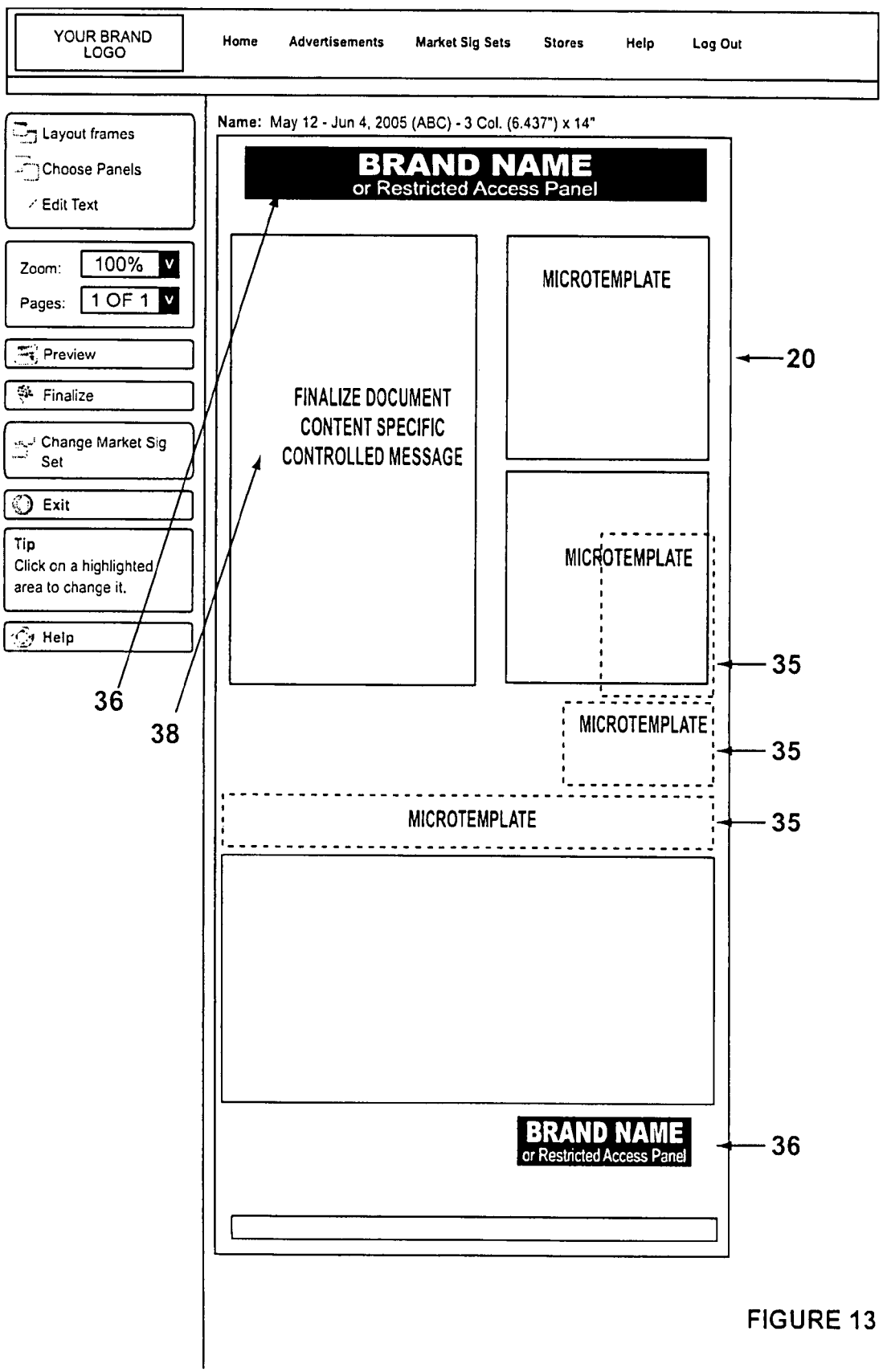
FIG. 13 is a screenshot depicting an editor page of the OPP showing a layout of the frames on the macrotemplate with highlighted editable panels.
Figure 14:
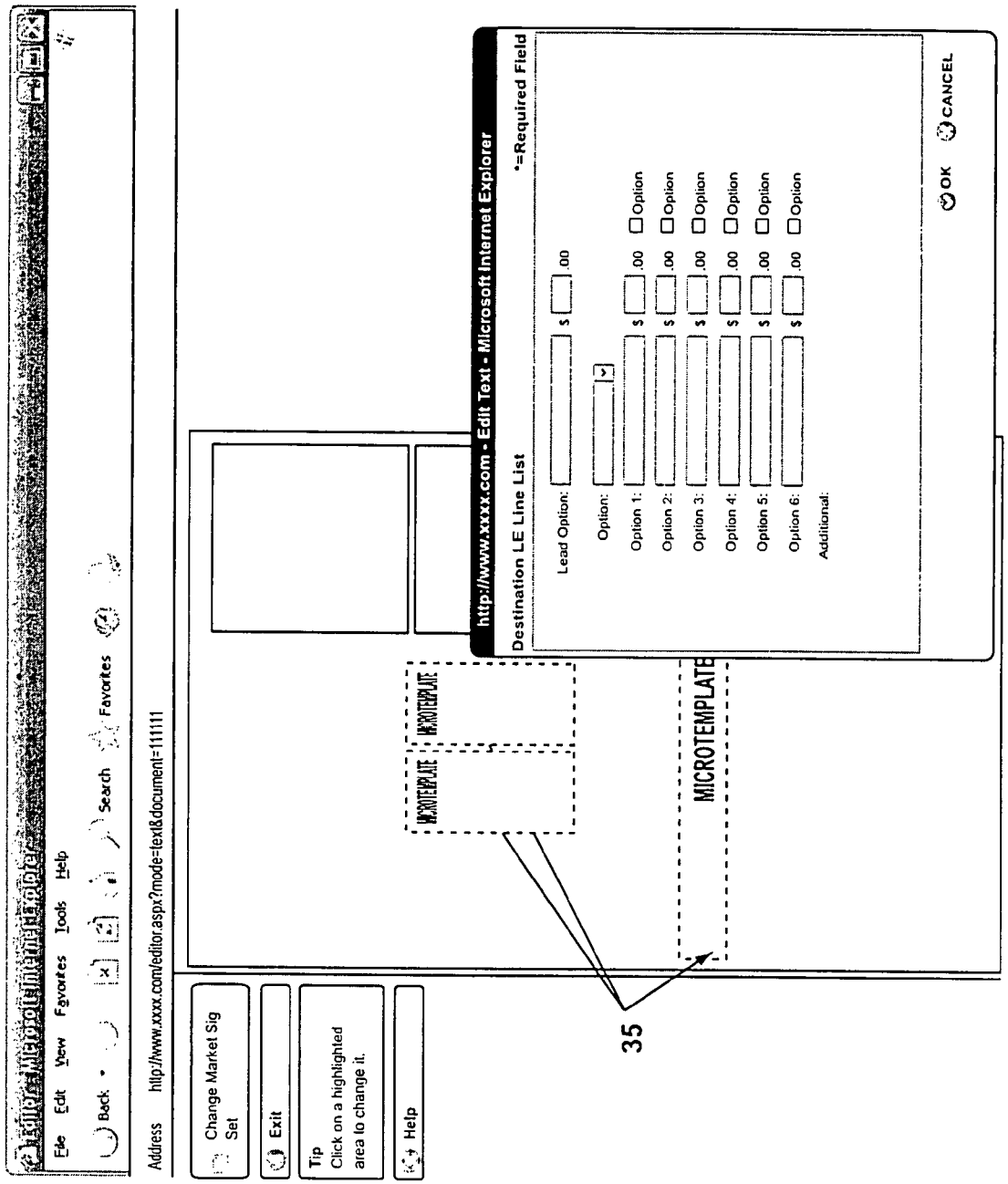
FIG. 14 is a screenshot depicting an editor page of the OPP showing an edit text window with edit options.

FIGS. 5(*a*) through 5(*c*) are to be considered in tandem as depicting the "edit a new document" routine. The noted diagram(s) thus details how a new document is edited or altered in the visual editor. The diagram begins with the user being taken to the editor page by either creating a new document or editing an existing one. The system collects boxes from the document boxes collection and the original template boxes collection and merges the collections together. The system then selects the boxes that can be displayed based on the mode of the editor. If the system finds no boxes in the merged collection for the current edit mode that have been marked as changeable then the system displays a message to the user informing them that there are no changeable items in the current editing mode and a suggestion to change edit mode as generally depicted in FIG. 10.

If the system does find boxes in the merged collection for the current edit mode that have been marked as changeable then the system inserts highlighted overlays into the web page markup highlighting the positions of the boxes over the preview displayed to the user. The system also collects lists of a template panel frames that have been pre-selected for placement into the highlighted areas and inserts the list into the web page markup for display if the user selects a highlighted area. The user is shown the editor page with a preview of the document overlaid with highlighting of the areas of the document that can be changed in the current edit mode. The user selects a highlighted area and is shown a list of available template panel frames that can be placed into the pre-defined area. The user selects a template panel frame from the list submitting it to the web server. Notably, the provision of various pre-selected panel frames or microtemplates virtually eliminates the need for the user to be trained in or skilled with the supporting template-constructing software. In other words, the user can simply point, click and swap templates into a supporting macrotemplate, thus making the front end of the system user-friendly.

The system takes the selected template panel frame and inserts it into the data queue, if an existing template panel frame has been assigned to that pre-defined area then it is removed from the data queue first, with cascading removal of dependant panels and text edits from the data queue and document box collection. After all removal of any prior template panel frames has been completed, the selected template panel frame is inserted into the data queue and boxes from the template panel frame are copied from the template boxes collection into the document boxes collection. Once all changes to the data queue have been completed the data queue and original base template for the document template is passed to the document processor so that a new document can be created and saved as the working document.

The system refreshes the editor page generating a new preview of the document showing the selected panel frame in the pre-defined area. Once the editor page is displayed to the user the user may opt to change the edit mode to panel mode from the side menu. The system collects boxes from the document boxes collection and the original template boxes collection and merges the collections together. The system then selects the boxes that can be displayed based on the mode of the editor. If the system finds no boxes in the merged collection for the current edit mode that have been marked as changeable then the system displays a message to the user informing them that there are no changeable items in the current editing mode and a suggestion to change edit mode.

If the system does find boxes in the merged collection for the current edit mode that have been marked as changeable then the system inserts highlighted overlays into the web page markup highlighting the positions of the boxes over the preview displayed to the user. The system also collects lists of a template panels that have been pre-selected for placement into the highlighted areas and inserts the list into the web page markup for display if the user selects a highlighted area. The user is shown the editor page with a preview of the document overlaid with highlighting of the areas of the document that can be changed in the current edit mode. The user selects a highlighted area and is shown a list of available template panels that can be placed into the pre-defined area. The user selects a template panels from the list submitting it to the web server.

The system takes the selected template panel and inserts it into the data queue, if an existing template panel has been assigned to that pre-defined area then it is removed from the data queue first, with cascading removal of dependant text edits from the data queue and document box collection. After all removal of any prior template panels has been completed the selected template panel is inserted into the data queue and boxes from the template panel are copied from the template boxes collection into the document boxes collection. Once all changes to the data queue have been completed the data queue and original base template for the document template is passed to the document processor so that a new document can be created and saved as the working document. The system refreshes the editor page generating a new preview of the document showing the selected panel in the pre-defined area. Once the editor page is displayed to the user the user selects to change the edit mode to text edit mode from the side menu.

The system collects boxes from the document boxes collection and the original template boxes collection and merges the collections together. The system then selects the boxes that can be displayed based on the mode of the editor. If the system finds no boxes in the merged collection for the current edit mode that have been marked as changeable then the system displays a message to the user informing them that there are no changeable items in the current editing mode and a suggestion to change edit mode. If the system does find boxes in the merged collection for the current edit mode that have been marked as changeable then the system inserts highlighted overlays into the web page markup highlighting the positions of the boxes over the preview displayed to the user. The user is shown the editor page with a preview of the document overlaid with highlighting of the areas of the document that can be changed in the current edit mode. The user selects a highlighted area and a popup window is displayed showing a form for the selected text box that contains a list of fields containing text that can be changed by the end user. The text shown in the form is pre-marked as being editable by an administrative user. The pre-marked text is extracted during markup and stored in data storage for speedier access and reporting when displaying forms. The form itself is generated based on the marked up text.

The user makes the text changes they need to and submits it to the web site. The system checks the entered text for possible errors and if errors are found displays an error message for the user detailing the errors found. If no errors were found then the system merges the text edits made by the user into the existing text data for the textbox being edited. If existing text edits exist for the text box in the command queue then these are removed before the new text edits are inserted into the data queue. Once all changes to the data queue have been completed the data queue and document are passed to the document processor so a new preview can be generated for the user. The system refreshes the editor page generating a new preview of the document showing the text changes made by the user. The user continues making changes to the document until done. The user then exits the document editor.

Figure 19A:
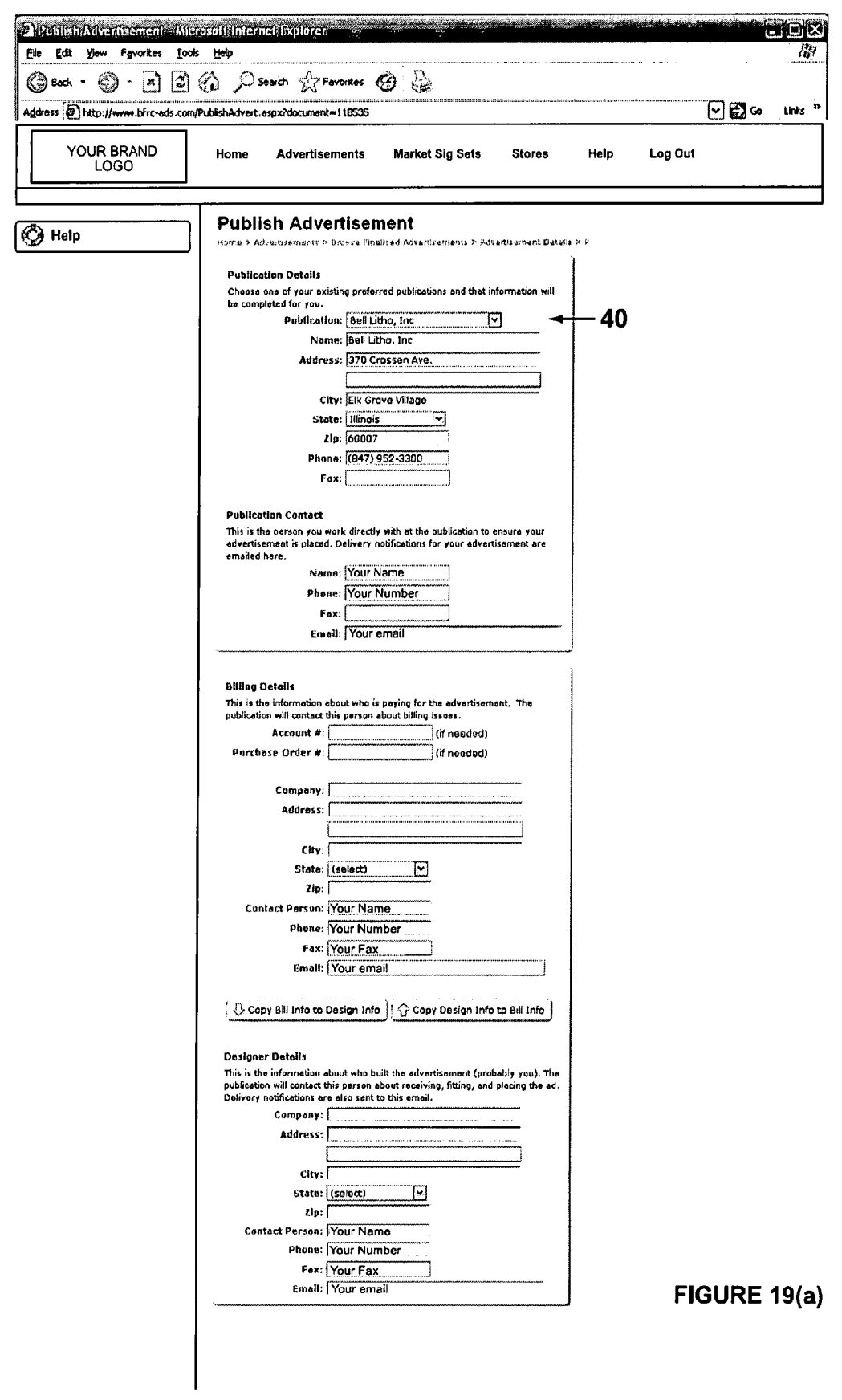
Figure 19B:
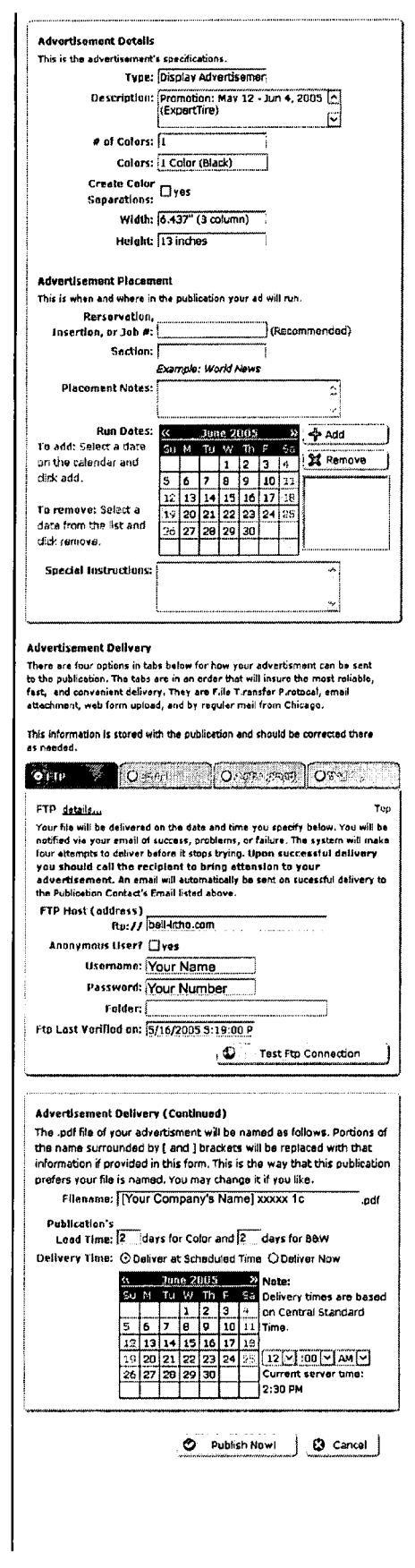
Figure 21:
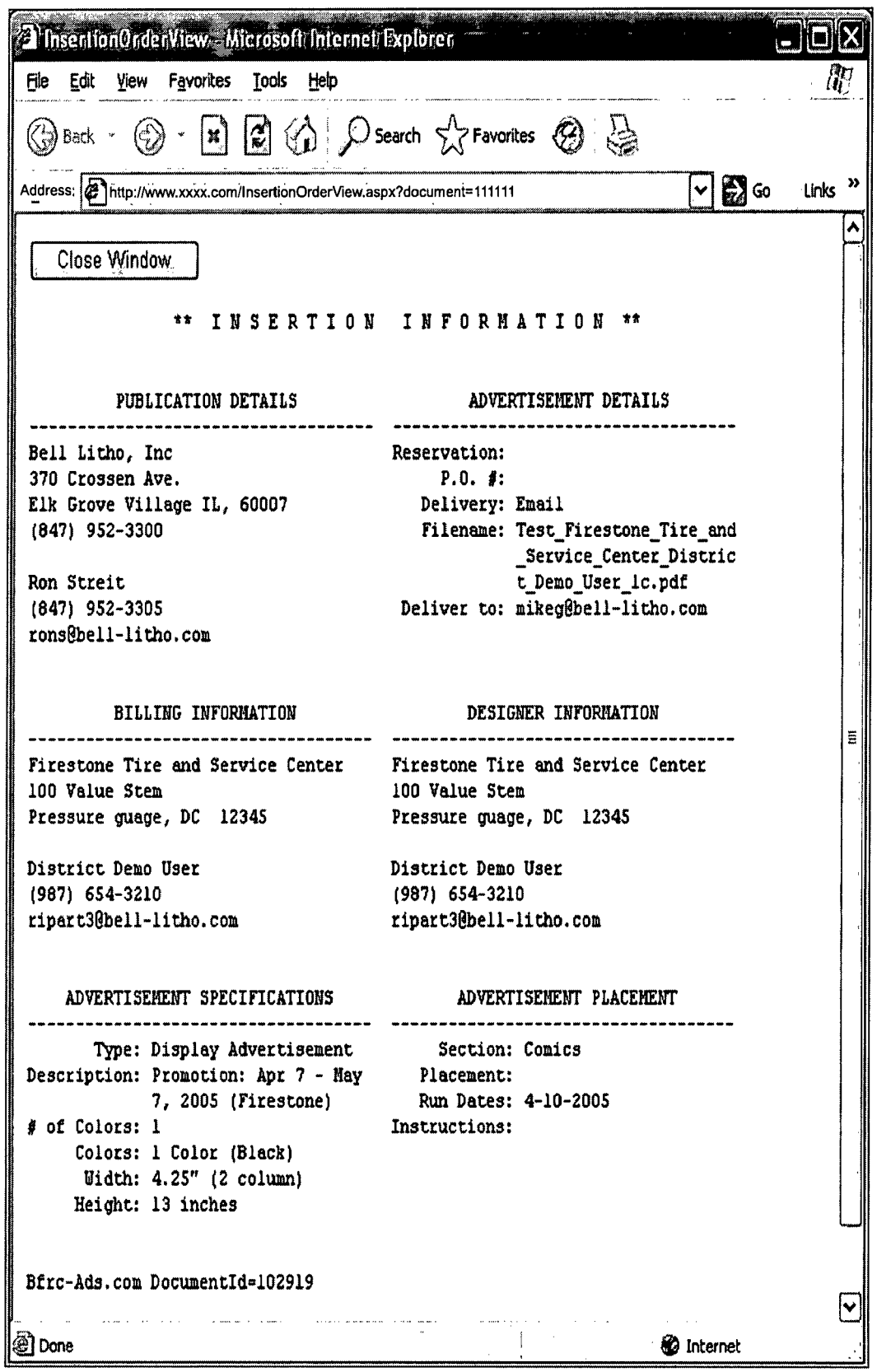
FIG. 21 is a screenshot of an insertion order view page of the OPP depicting insertion information.

To publish a document as rendered from the finalized macrotemplate, the user must first select a publisher to whom the document will be sent. In this regard, a publish document page is displayed whereupon a number of publishing criteria are displayed, one of which is selection of the publisher (as achieved via a drop down menu and a precompiled publisher data store) as generally referenced at 40 in FIG. 19(*a*). Typically, the publisher is newspaper, but can be any company that uses digital print ready files and can receive them electronically. The user may then complete or fill-in additional details that are commonly sent along with the print-ready file, otherwise known as an insertion order. Exemplary additional detail prompts are further represented or depicted in FIGS. 19(*a*) and 19(*b*). The additional detail information may then be sent via email while the digital print ready file is sent via electronic means as required by the consumer of the publication or consumer of the file and a confirmation email may also sent to the user, all as referenced at 41 in FIG. 2. FIG. 20 is a screenshot of an advertisement details page of the OPP depicting details of the advertisement to be published. FIG. 21 is a screenshot of an insertion order view page of the OPP depicting insertion information.

Certain file delivery queues have been built as independent programs that are not specifically tied to the online publishing portal. The queues serve the online publishing portal by facilitating the delivery of finished documents. This is done via the electronic means of file transfer protocol (FTP) and file attachments in emails. The queues where designed as separate self standing services to provide more robustness and reusability with other programs.

The queues both have the ability to schedule delivery of electronic files of any type. They also both send multiple email notifications of the status, success, or failure of this delivery to groups of emails for each type of notification. The sender or sending program also has the option to insert a custom message in the body of the email notifications and that of the email containing the attachment.

Figure 22:
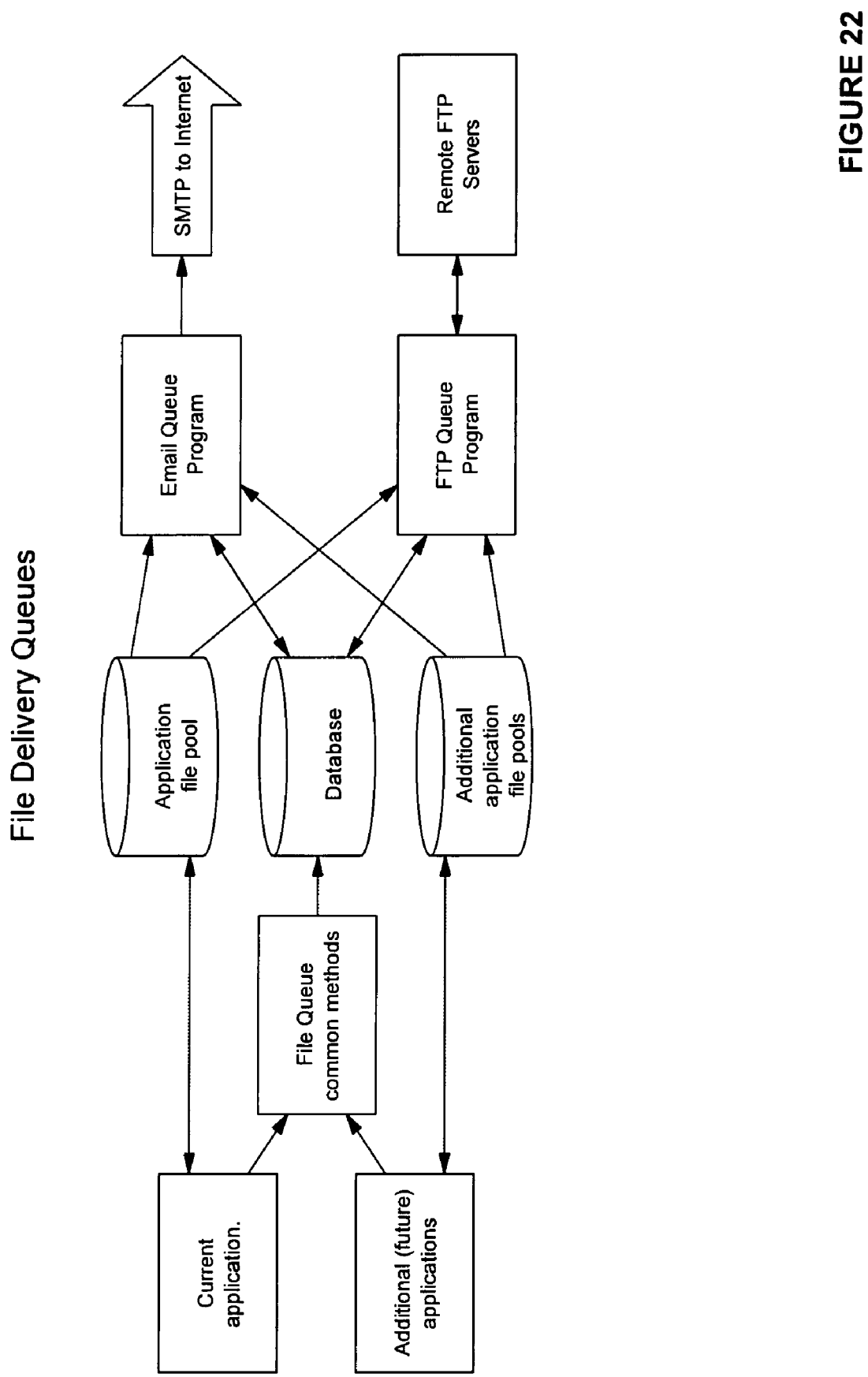
FIG. 22 is a flowchart diagram depicting a high-level overview of how certain queues work with outside applications and remote servers.

The queues expose to any application a set of programming methods for placing items into the queues. This includes the sender and recipient information, locations of the files to send, and custom messages to include with the notifications and delivered emails. This information is stored in a database that is pooled and updated by both queues. The reader is thus directed to FIG. 22 for a diagrammatical depiction of the foregoing.

Figure 23:
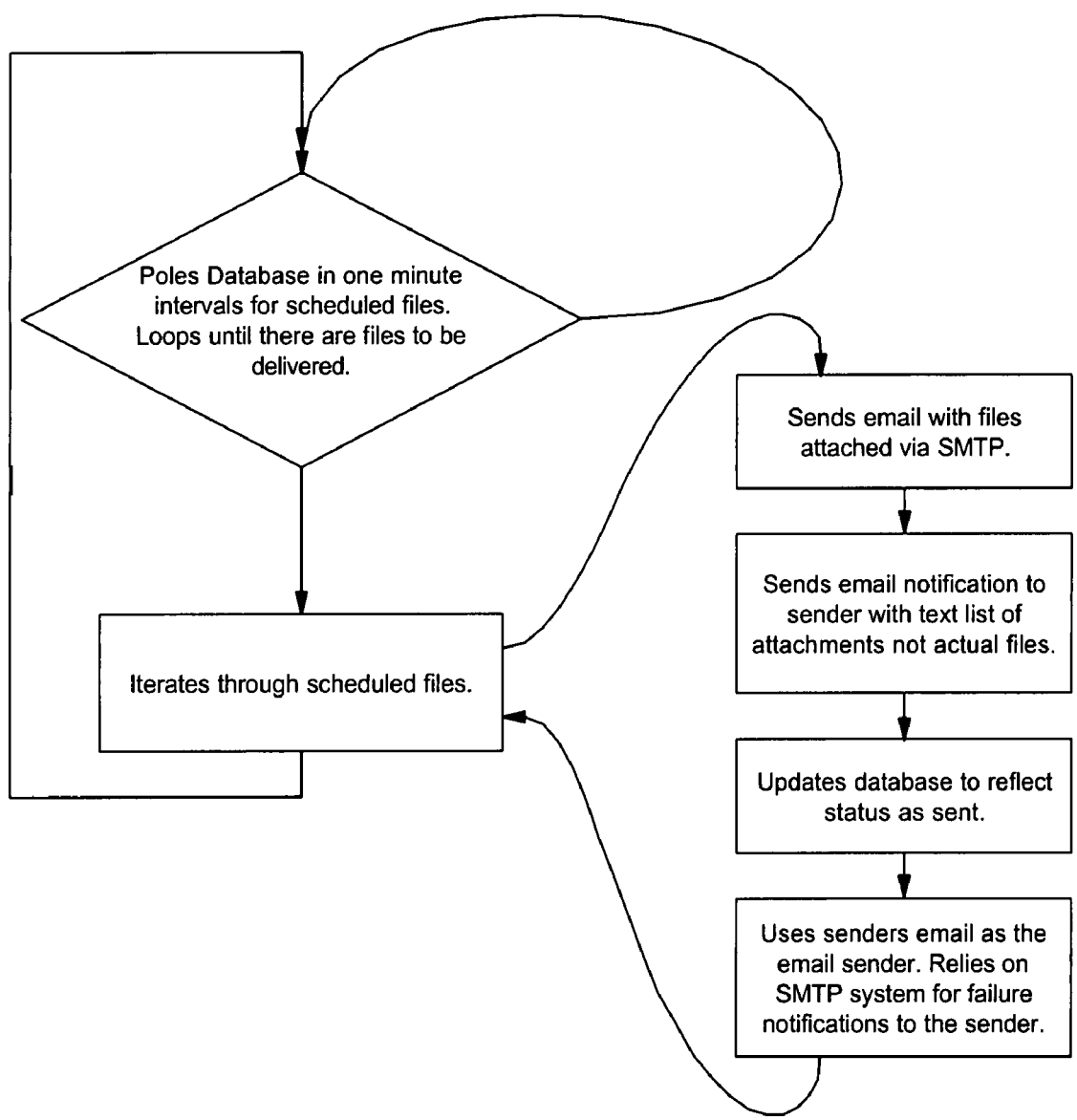
FIG. 23 is an overview of the program execution for the email queue program.

FIG. 23 is an overview of the program execution for the email queue program. The email queue relies on standard Simple Mail Transfer Protocol (SMTP) for delivery. It specifically uses the email address of the sender, as this information is attached to every user of the main application, as being that of the sender for all emails related to a queue of files. This insures that non-delivery notifications of the SMTP system are sent to the person who queued the file. This also directs replies by recipients back to the person sending the file. Success or failure of delivery relies on the SMTP system.

Figure 24:
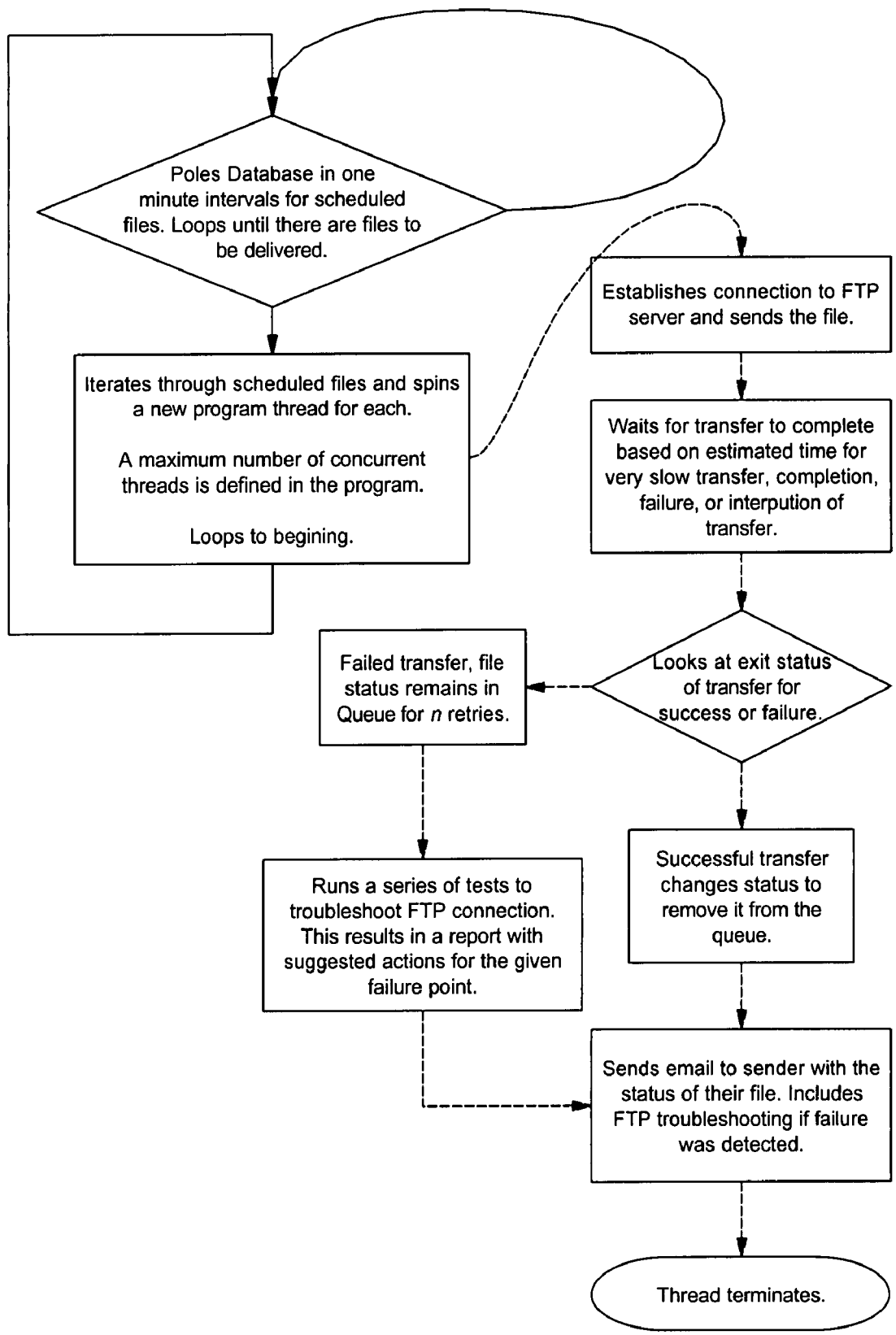
FIG. 24 is an overview of the program execution for the file transfer protocol (FTP) queue program.

FIG. 24 is an overview of the program execution for the file transfer protocol (FTP) queue program. The FTP queue also uses the email address of the person sending the files to ensure also that replies and delivery notifications are received. The FTP delivery connects directly with remote FTP servers and can verify delivery of the files and troubleshoot delivery problems. Failures result in a set number of retries at set intervals, each with notification, until the program gives up and again notifies the sender via email.

Troubleshooting the FTP remote works in the following order until a problem is encountered. Based on the point of failure in FTP delivery it can determine and recommend an appropriate remedy. This provides assistance to the end user. (1) Check that the remote host's IP address or domain name is valid; (2) Check for connectivity over ICP port 21 and a response of 220 (ftp welcome message) to determine the presence of an FTP server; (3) If an FTP server is not found check for connectivity over TCP port 80 for the presence of a web site. The user can then be advised that it's a web site not an ftp site; (4) Check for connection to FTP server using the username and password entered; (5) If username and password fail try to connect to FTP server using anonymous mode; (6) Attempt to upload a small test file to check for upload permissions; and (7) Delete test file from server as a courtesy not as a test requirement.

Preferably the foregoing system is built upon a QUARK® Dynamic Document Server (QUARKDDS) platform. Conceivably, the present system could have been built upon a portable document format system, but the dynamic document server by QUARK is superior to other current platforms. The QUARKDDS server is a base system for storing, reporting, and rendering documents. The rendered outputs are used for previews while working on a document and high quality rendering for final outputs. It renders a QUARK document exactly as it would be rendered on the desktop version (i.e. QUARKXPRESS) allowing for advanced text and graphical layout.

The QUARKDDS system, however, has limitations in terms of its functionality and in this regard, certain enhancements to the underlying system were created by way of obtaining complete access to XPRESS tags, the result being the online publishing portal of the present invention. The system creates a friendly streamlined front end to enable the typesetting functionality through a web interface. Using complete access to the XPRESS tags and knowing if a text box has overflowed, the present system enables the user to fit greatly varying amounts of text into a designated space in a document. Using up to seven different styles for a given place-holder in an advertisement, it can neatly list between 1 and 65 retail locations in this space. Final type fitting is achieved by adjusting the line spacing in the style and checking for overflowed text.

This can generate up to 200 requests to the dynamic document server, which it completes in seconds.

Using the ability to copy grouped elements from one document to another, end users are able to click on a changeable panel in the user interface and select from a cascading menu predetermined content. This allows them to make major and minor changes in just two clicks while preserving brand integrity with pre-determined options. In each option the user is able to make text changes by clicking on a highlighted panel and completing the custom form for that panel. In this case, formatting of the text is pre-determined as the user is not entering copy, but only changing certain offerings.

Thus, while the foregoing specifications delineate much specificity, the same should not be construed as limiting the invention, but as providing a backdrop from which the essence of the present invention emerges. It is contemplated that the branded portions are controlled by a singular ubiquitous source of control wherein the offering or message portions are controlled by a plurality of localized control sources on an as-needed basis. This brand control in a network environment for instantly publishing plate-ready, digitally based documents is novel to the industry.

It is further contemplated that the present invention discloses various inventive aspects stemming from the same core concepts, including certain methods for conveying high integrity branded messages to recipients; an online publishing portal for publishing high integrity branded messages from desktops in a network environment; and a networked system for enabling geographically-spaced common-brand users to publish locale-specific, brand-controlled messages. Provided with electronic means for conveying a branded message, including user-based data input and output means, publisher-based data output means, central processing means (having certain data stores precompiled), and a communication network interconnecting the same, it is contemplated that the method for conveying high integrity branded messages to recipients comprises certain steps or methodology. In other words, the methodology relies upon certain underlying structure and need.

In this last regard, the central processing means or dynamic document server of the present invention necessarily comprises a precompiled template data store, a user data store, and a publisher data store. The precompiled template data store comprises at least one, but preferably a wide selection of pre-constructed electronic or digital so-called macrotemplates. Each macrotemplate is in a plate-ready, portable document format for output. The macrotemplate comprises at least one brand microtemplate and at least one message microtemplate. The brand microtemplate conveys or comprises certain brand name information such as a company's trademark and/or trade dress, and the message microtemplate conveys or comprises certain message information, such as an advertising or marketing message. The user data store comprises clearance level data, specifically regarding whether certain credentials, as input by the user, enable access to the microtemplates for alteration.

Thus, it is contemplated that the method includes first inputting a user's credentials into the central processing means via the user-based data input means and the communication network. The user's credentials are then authenticated (as previously specified) against the user data store. The authenticated user's credentials provide selective access to the macrotemplate. When accessing the macrotemplate, the accessed macrotemplate comprises a select alterable microtemplate, the select alterable microtemplate being selected from the group consisting of the brand microtemplate and the message microtemplate. The select alterable microtemplate is selected based upon the user's clearance level and preferably highlighted as specified so that the user more readily recognize those panels or templates that he or she is allowed to alter. In most cases, the select alterable template is the message template as most usage of the system is for delivering brand-protected or brand-controlled messages. Thus, if a high-level user were to enter high level security clearance credentials, he or she would be able to modify either the brand template or the message template, whereas a low level user, entering low level security clearance credentials is restricted to the open access message template(s).

The user may then selectively edit or alter the select alterable microtemplate. After the (micro)template is altered, if necessary, the macrotemplate is finalized (as previously specified). The finalized macrotemplate is thus checked for predefined errors, the predefined errors being defined by a system operator. The user may then select a publisher from the precompiled publisher data store and electronically send the finalized macrotemplate (as a digital print-ready or plate-ready file) to the publisher via the communication network. The finalized macrotemplate is thus output to the publisher for publication via the publisher-based data output means. Upon receipt of the finalized macrotemplate, the selected publisher may then publish the brand information and the message information as compiled upon the finalized macrotemplate. The published brand and message information thus conveying high integrity branded message to recipients.

Notably, the central processing means may be defined by a dynamic document server for enabling dynamic document alteration. As previously specified, QUARK-based programs tend to require a significant amount of training or experience so as to efficiently create QUARKXPRESS documents. The system of the present invention enables pre-constructed microtemplates to swapped and assembled into a macrotemplate so that users who are otherwise unskilled in dynamic document alteration are enabled to edit the select microtemplate by common two-click methodology. The restricted access template(s) or microtemplates requiring high level security clearance may be selected from the group consisting of a brand template and a legal notice template, it being noted that, in addition to brand information, legal notice information is also necessarily controlled so that the legal rights of the property owner may be properly protected. The select alterable microtemplate may preferably be highlighted during the step of accessing the macrotemplate.

The method may comprise an additional step after selectively editing the select alterable microtemplate, the additional step being reviewing the macrotemplate for finalization. Further, the method may comprise an additional step after selectively editing the select alterable microtemplate, the additional step being copy-fitting the edited select alterable microtemplate, the step of copy-fitting being automatic as previously specified.

The online publishing portal for publishing high integrity branded messages from desktops in a network environment essentially comprises user authentication means (as previously specified) and at least one digital, selectively alterable macrotemplate, the macrotemplate being in a plate-ready format. The macrotemplate comprises at least one brand panel and at least one message panel, the brand panel comprising brand information, the message panel comprising message information. The user authentication means authenticates a user's input credentials and renders a clearance level, the clearance level being based upon the user's input credentials. The user's input credentials thus provide selective access to the macrotemplate, the selectively-accessed macrotemplate comprising a select alterable microtemplate. The select alterable microtemplate is selected from the group consisting of the brand panel and the message panel, the select alterable template being selected based upon the clearance level. The select alterable microtemplate is thus editable and the macrotemplate is thus publishable.

The online publishing portal is preferably based from a dynamic document server, the dynamic document server for enabling dynamic document alteration. Users unskilled in dynamic document alteration are enabled to edit the select microtemplate via the system as structured. The macrotemplate may comprise at least one legal panel, the legal panel being alterable by a high-level user. The select alterable microtemplate is highlighted according to the clearance level, the highlighted microtemplate prompting the user with panel edit options. The macrotemplate is selectively reviewable as the user may elect. The macrotemplate is preferably finalized or electronically proofed prior to publication substantially as earlier specified. The select alterable microtemplate is preferably automatically copy-fittable. The online publishing portal may further preferably comprise a link to a select publisher, the macrotemplate being electronically transmittable to the select publisher for publishing the brand information and the message information as compiled upon the macrotemplate. The publishable brand and message information is presented to the select publisher for conveying high integrity branded messages to recipient.

Thus, it will be understood the present invention disclose a networked system for enabling geographically-spaced common-brand users to publish locale-specific, brand-controlled messages or content-controlled messages. The networked system comprises means for creating or altering digital, plate-ready macrotemplates, central storage means for storing the macrotemplate, means for selectively accessing to the macrotemplate (which means may be defined by means for authorizing selective access to the macrotemplate and means for accessing the macrotemplate), and means for publishing information compiled upon the macrotemplate. The macrotemplate comprises a plurality of digital, plate-ready microtemplates, the microtemplates comprising at least one brand template and at least one message template. The means for authorizing selective access to the macrotemplate enables users to edit a select microtemplate, the select microtemplate being selected from the group consisting of the brand template and the message template. The means for publishing information compiled upon the microtemplate enables users to publish locale-specific, brand-controlled messages. The users have clearance credentials; the means for authorizing selective access to the macrotemplate enabling the users to edit the select microtemplate based upon the clearance credentials. The means for accessing the macrotemplate enables unskilled users to edit a select microtemplate. The means for creating digital, plate-ready macrotemplates, central storage means for storing the macrotemplate(s), and means for authorizing selective access to the macrotemplate(s) are preferably driven by a dynamic document server.

Accordingly, although the invention has been described by reference to a preferred methodology and/or system, it is not intended that the novel processes or system(s) be limited thereby, but that modifications thereof are intended to be included as falling within the broad scope and spirit of the foregoing disclosure, the following claims and the appended drawings.

We claim:

1. A platform-independent, networked system for enabling geographically-spaced common-brand users to publish locale-specific, brand-controlled messages, the networked system comprising:

platform-independent means for creating digital, plate-ready macrotemplates, central storage means for storing the macrotemplates, means for authorizing selective access to the macrotemplates, ubiquitous means for continually monitoring and controlling macrotemplate access and alteration, means for accessing the macrotemplates, means for publishing information compiled upon the macrotemplates, and a communication network, the central storage means comprising a user data store and a publisher data store, the means for authorizing selective access to the macrotemplates authenticating the user's credentials against the user data store, the authenticated user's credentials providing selective access to the macrotemplate, the created macrotemplates each comprising a plurality of digital, plate-ready microtemplates, the microtemplates comprising at least one brand template and at least one message template, the means for authorizing selective access to the macrotemplates enabling select users to edit a select microtemplate, the select microtemplate being selected from the group consisting of the brand template and the message template, said means for continually monitoring and controlling macrotemplate access and alteration continually monitoring and controlling macrotemplate access, content, and distribution, the means for publishing information compiled upon the macrotemplates enabling the user to select a publisher, the publisher being selected from the publisher data store, the communication network enabling the user to electronically send a finalized macrotemplate to the selected publisher, the finalized macrotemplate being output to the selected publisher for publication, the networked system thus enabling geographically-spaced common-brand users to publish locale-specific, brand-controlled messages.

2. The system of claim 1 wherein the users have clearance credentials, the means for authorizing selective access to the macrotemplates enabling the users to edit the select microtemplate based upon the clearance credentials.

3. The system of claim 2 wherein the select microtemplate is highlighted according to the clearance credentials, the highlighted microtemplate prompting the user with panel edit options.

4. The system of claim 1 wherein the platform-independent means for creating digital, plate-ready macrotemplates, central storage means for storing the macrotemplates, means for authorizing selective access to the macrotemplates, and means for continually monitoring and controlling macrotemplate access and alteration are driven by a dynamic document server.

5. The system of claim 4 wherein the means for accessing the macrotemplates enable unskilled users to edit the select microtemplate.

6. The system of claim 1 wherein the macrotemplate is electronically proofable prior to publication.

7. The system of claim 1 wherein the select microtemplate is automatically copy-fittable.

8. A system for enabling geographically-spaced common-brand users to publish locale-specific, content-controlled messages, the system comprising:

centralized, platform-independent means for creating plate-ready macrotemplates from a variety of dissimilar platforms, central storage means for storing the macrotemplates, means for authorizing selective access to the macrotemplates, ubiquitous means for continually monitoring and controlling macrotemplate access and alteration, means for accessing the macrotemplates, means for publishing information compiled upon the macrotemplates, and a communication network, the central storage means further comprising a user data store and a publisher data store, the means for authorizing selective access to the macrotemplates authenticating the user's credentials against the user data store, the authenticated user's credentials providing selective access to the macrotemplate, each created macrotemplate comprising a plurality of plate-ready microtemplates, the microtemplates comprising at least one informational brand template and at least one informational message template, the means for authorizing selective access to the macrotemplates enabling select users to edit a select microtemplate, the select microtemplate being selected from the group consisting of the brand template and the message template, said means for continually monitoring and controlling macrotemplate access and alteration continually monitoring and controlling macrotemplate access, content, and distribution, the means for publishing information compiled upon the macrotemplates enabling the user to select a publisher, the publisher being selected from the publisher data store, the communication network enabling the user to electronically send a finalized macrotemplate to the selected publisher, the finalized macrotemplate being output to the selected publisher for publication, the networked system thus enabling geographically-spaced common-brand users to publish locale-specific, content-controlled messages.

9. The system of claim 8 wherein the users have clearance credentials, the means for authorizing selective access to the macrotemplate enabling the users to edit the select microtemplate based upon the clearance credentials.

10. The system of claim 8 wherein the centralized, platform-independent means for creating plate-ready macrotemplates, central storage means for storing the macrotemplates, means for authorizing selective access to the macrotemplates, and means for continually monitoring and controlling macrotemplate access and alteration are driven by a dynamic document server.

11. The system of claim 10 wherein the means for accessing the macrotemplate enables unskilled users to edit the select microtemplate.

12. The system of claim 8 comprising means for electronically proofing the macrotemplate prior to publication.

13. The system of claim 8 comprising means for automatically copy-fitting the select microtemplate.

14. A platform-independent system for enabling common-brand users to publish content-controlled messages from a variety of dissimilar platforms, the system comprising:

centralized, platform-independent means for creating plate-ready macrotemplates, central storage means for storing the macrotemplates, means for selectively accessing the macrotemplates, ubiquitous means for continually monitoring and controlling macrotemplate alteration, means for publishing information compiled upon the macrotemplates, and a communication network, the central storage means comprising a user data store and a publisher data store, the means for authorizing selective access to the macrotemplates authenticating the user's credentials against the user data store, the authenticated user's credentials providing selective access to the macrotemplate, each created macrotemplate comprising a restricted access microtemplate and an open access microtemplate, the means for selectively accessing to the macrotemplates enabling select users to edit a select microtemplate, the select microtemplate being selected from the group consisting of the restricted access microtemplate and the open access microtemplate, said means for continually monitoring and controlling macrotemplate access and alteration continually monitoring and controlling macrotemplate access, content, and distribution, the means for publishing information compiled upon the macrotemplates enabling the user to select a publisher, the publisher being selected from the publisher data store, the communication network enabling the user to electronically send a finalized macrotemplate to the selected publisher, the finalized macrotemplate being output to the selected publisher for publication, the networked system thus enabling geographically-spaced common-brand users to publish content-controlled messages.

15. The system of claim 14 wherein the users have clearance credentials, the means for selectively accessing to the macrotemplate enabling the users to edit the select microtemplate based upon the clearance credentials.

16. The system of claim 14 wherein the centralized, platform-independent means for creating plate-ready macrotemplates, central storage means for storing the macrotemplates, means for selectively accessing to the macrotemplates, and means for continually monitoring and controlling macrotemplate access and alteration are driven by a dynamic document server.

17. The system of claim 16 wherein the means for selectively accessing the macrotemplate enable unskilled users to edit the select microtemplate.

18. The system of claim 14 wherein the restricted access template is selected from the group consisting of a brand template and a legal notice template.

19. The system of claim 14 comprising means for electronically proofing the macrotemplate.

20. The system of claim 14 comprising means for copy-fitting the select microtemplate.

* * * * *